United States Patent

Aoyama et al.

[11] Patent Number: 5,844,873
[45] Date of Patent: Dec. 1, 1998

[54] DISC READING APPARATUS HAVING A TRANSFERABLE MOTOR UNIT AND MOTOR POWER DISCONNECTION

[75] Inventors: Noboru Aoyama; Hiroshi Nakane, both of Fukaya; Takuro Ono, Honjo, all of Japan

[73] Assignee: Kabushiki Kaisha Toshiba, Kawasaki, Japan

[21] Appl. No.: 379,481

[22] PCT Filed: Jun. 3, 1994

[86] PCT No.: PCT/JP94/00900

§ 371 Date: Apr. 21, 1995

§ 102(e) Date: Apr. 21, 1995

[87] PCT Pub. No.: WO94/29860

PCT Pub. Date: Dec. 22, 1994

[30]     Foreign Application Priority Data

Jun. 3, 1993  [JP]  Japan .................................. 5-133673
Jun. 3, 1993  [JP]  Japan .................................. 5-133674
Jun. 3, 1993  [JP]  Japan .................................. 5-133675
Jun. 3, 1993  [JP]  Japan .................................. 5-133676
Jun. 3, 1993  [JP]  Japan .................................. 5-133677

[51] Int. Cl.$^6$ .................................................. G11B 33/04
[52] U.S. Cl. ............................................................ 369/75.2
[58] Field of Search .................................. 369/75.1, 75.2, 369/77.1, 77.2; 200/51.12; 360/99.06

[56]         References Cited

U.S. PATENT DOCUMENTS 4,536,865   8/1985   Kenmostu et al. ..................... 369/77.1
5,012,462   4/1991   Tsujita ..................................... 369/77.1
5,187,701   2/1993   Verheyen ............................... 369/77.1

Primary Examiner—Stuart S. Levy
Assistant Examiner—David D. Davis
Attorney, Agent, or Firm—Finnegan, Henderson, Farabow, Garrett & Dunner, L.L.P.

[57]         ABSTRACT

The present invention relates to a disc reproducing apparatus for allowing a tray that holds a disc to be unloaded and loaded from and in a cabinet. In the disc reproducing apparatus, a motor mount that holds a disc motor and a turn table can be transferred between the tray and a chassis in the cabinet. The tray has a pair of cavity portions functioning as a portion for holding a motor mount. The chassis has a pair of protrusion portions of guide shafts, a pair of lock levers, and a pair of guide protrusions as a portion for holding the motor mount. The lock levers are used as a means for transferring the motor mount between the tray and the chassis.

31 Claims, 18 Drawing Sheets

SECTION X - X

SECTION X - X

PARTIAL ENLARGED VIEW

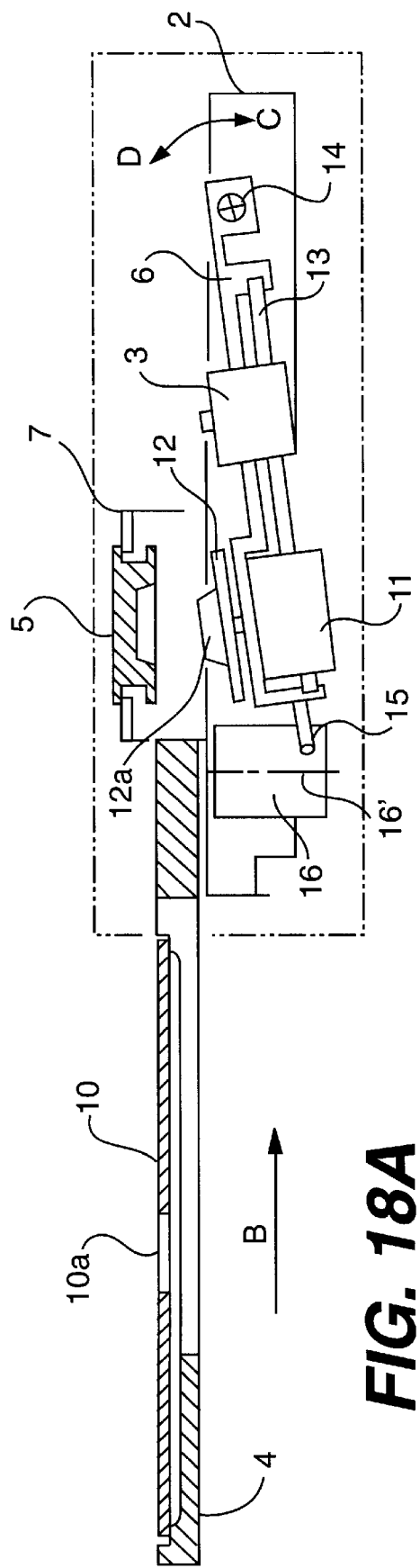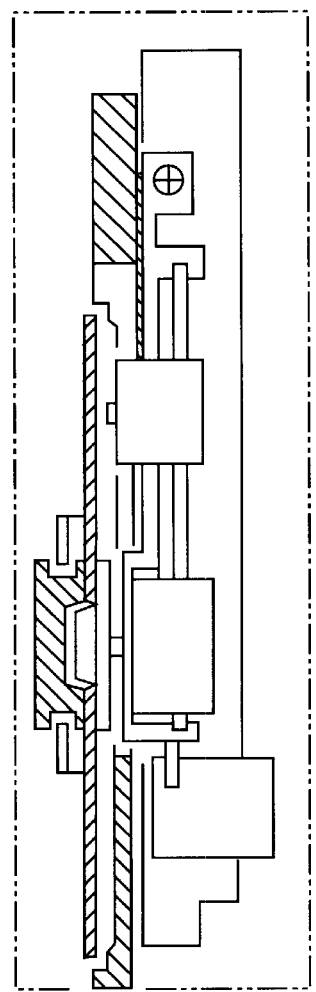
FIG. 18A (PRIOR ART)
FIG. 18B (PRIOR ART)

DISC READING APPARATUS HAVING A TRANSFERABLE MOTOR UNIT AND MOTOR POWER DISCONNECTION

TECHNICAL FIELD

The present invention relates to a disc reproducing apparatus such as a CD player, a CD-ROM drive, an optical magnetic disc drive, or the like.

RELATED ART

In recent years, the size and weight of disc reproducing apparatuses such as CD players and CD-ROM drives that use optical discs as recording mediums have been reduced. In addition, disc reproducing apparatuses that are mounted on computers have been developed. In conventional disc reproducing apparatuses, a tray that holds a disc is unloaded and loaded from and into a cabinet.

FIGS. 17, 18A, and 18B are schematic diagrams showing a conventional disc reproducing apparatus.

In these drawings, reference numeral 1 is a cabinet. In the cabinet 1, a chassis 2 is disposed. The chassis 2 comprises an optical pickup 3, a tray 4, a turn table 12, and a clamper 5. The pickup 3 reads record information from a disc 10. The pickup 3 is supported by a guide shaft 13 secured to a base 6 and movable along the guide shaft 13 in arrow directions A–B. The tray 4 is supported by guide grooves 2a, 2a formed on both sides of the chassis 2. The tray 4 is movable along the guide grooves 2a and 2a in the arrow directions A–B. The tray 4 can be pulled out of the cabinet 1 in the arrow direction A for a predetermined amount. The clamper 5 is held by a plate 7 in such a manner that the clamper 5 is vertically movable. A motor 11 that drives the turn table 12 is secured to the base 6 of the pickup 3. The turn table 12 is secured to the rotating shaft of the motor 11. A disc chuck 12a is formed on the upper surface of the turn table 12. The disc chuck 12a fits into a center hole 10a of the disc 10. One edge portion is rotatably supported by the main body of the chassis 2 through a shaft 14. The other edge portion of the base 6 is connected to a rotating cam 16 through a pin 15. The rotating cam 16 has a spiral groove on the peripheral portion. The pin 15 is inserted into the spiral groove. When the rotating cam 16 is rotated, the position of the pin 15 varies in upper and lower directions. When the pin 15 moves in the upper and lower directions, the base 6 rotates in arrow directions C–D about the rotating shaft 14. Thus, the position of the turn table 12 is switched between a first position and a second position. At the first position, the disc 10 is nipped by the clamper 5 and the turn table 12. At the second position, a disc loading opening is formed by the clamper 5 and the turn table 12.

As shown in FIG. 18A, when the tray 4 is unloaded from the cabinet 1, the base 6 is inclined and the turn table 12 is placed at the second position, where the disc loading opening is open. After the tray 4 is loaded into the cabinet 1, the rotating cam 16 rotates in a predetermined direction. As shown in FIG. 18B, when the rotating cam 16 rotates, the base 6 rotates in the arrow direction C about the rotating shaft 14 for a predetermined angle. Thus, the turn table 16 rises and the disc 10 held on the tray 4 is nipped between the turn table 12 and the damper 5.

As described above, the disc reproducing apparatus has a mechanism that moves the turn table 12 in the upper and lower directions. However, since this mechanism occupies a large space in the cabinet 1, it is improper for accomplishing a compact disc reproducing apparatus.

To solve such a problem, a disc reproducing apparatus in which a tray that holds a disc drive mechanism including for example a turn table and a disc motor along with a disc can be unloaded and loaded from and into a cabinet has been developed. In this disc reproducing apparatus, since a means for holding a disc on a turn table while securing the disc is provided, a disc clamping mechanism or the like can be omitted from the cabinet and thereby the thickness of the apparatus can be reduced.

It is important to properly maintain the disc reproducing operation against an external shock. In particular, a disc reproducing apparatus mounted on a car should withstand strong shock as its essential requirement. In the disc reproducing apparatus shown in FIG. 17, since the chassis is supported by the cabinet through the damper, most of vibration that is transmitted from the cabinet to the chassis can be shielded. In addition, even if the chassis vibrates, since the disc drive mechanism and the pickup are supported by the same base, the vibration does not largely affect the disc reproducing operation. However, in the disc reproducing apparatus in which the disc drive mechanism is secured to the tray, the vibration of the tray is directly transmitted to the disc drive mechanism, displacement that cannot be ignored takes place between the disc and the pickup and thereby a data read error may result in.

Such disc reproducing error is reduced in the disc reproducing apparatus in which both the disc drive mechanism and the pickup are supported by the tray than in the apparatus in which only the disc drive mechanism is supported by the tray.

However, in the disc reproducing apparatus in which both the disc drive mechanism and the pickup are supported by the tray, a cabinet side circuit board and a tray side circuit board should be connected through a long flexible cable having large signal lines. Thus, when the tray is unloaded from the cabinet, the exposed flexible cable functions as an antenna and becomes a radiation noise (undesired radiation) source. The radiation noise adversely affects an external device (for example, host computer).

The undesired radiation results from electric energy that leaks from an oscillator that generates a clock for reading digital data from a disc. In recent years, disc reproducing apparatus that can read digital data at read speed twice, four times, or more higher than the standard read speed have been required. Thus, the clock frequencies of the disc reproducing apparatuses tend to increase. However, as the clock frequencies of the clock generating circuits increase, electric energy at high frequencies tends to easily leak out as undesired radiation.

In addition, when the cabinet side circuit board and the tray side circuit board are connected with a flexible cable, the flexible cable should be placed in the cabinet. Thus, the depth of the apparatus increases.

The present invention is made so as to solve such problems.

In other words, an object of the present invention is to provide a small and thin disc reproducing apparatus.

Another object of the present invention is to provide a disc reproducing apparatus that maintains disc reproducing operation against external vibration.

SUMMARY OF THE INVENTION

A disc reproducing apparatus according to the present invention comprises a cabinet, a tray for holding a disc, from which data is reproduced, the tray being supported by the cabinet so that the tray can be unloaded and loaded from and into the cabinet, a motor unit including a turn table and a motor, the turn table being adapted for securing the disc held on the tray, the motor being adapted for driving the turn table, a pickup for reading data recorded on the disc, a chassis including a mechanism for supporting the pickup in such a manner that the pickup is movable in the radial direction of the disc held on the tray, a first holding portion disposed on the tray and adapted for holding the motor unit at a predetermined position of the tray at least when the tray is unloaded from the cabinet, a second holding portion disposed on the chassis and adapted for holding the motor unit at a position where data is readable from the disc by the pickup at least when the tray is held in the cabinet, and a transfer means for transferring the motor unit held by the first holding portion to the second holding portion when the tray is inserted into the cabinet and for transferring the motor unit held by the second holding portion to the first holding portion when the tray is unloaded from the cabinet.

Thus, according to the present invention, when the tray is unloaded, since the motor unit is held at the first holding portion, a disc clamp mechanism or the like in the cabinet can be omitted.

In addition, according to the present invention, when the tray is loaded, since the motor unit is held at the second holding portion of a sub-chassis, the motor unit and the tray are supported by the chassis in such a manner that they do not contact. Thus, even if external vibration is applied to the disc reproducing apparatus, the vibration does not affect the disc reproducing operation.

BRIEF DESCRIPTION OF THE DRAWINGS

FIGS. 18A and 18B are sectional views for explaining the operation of the conventional disc reproducing apparatus of FIG. 17.

BEST MODES FOR CARRYING OUT THE INVENTION

Next, with reference to the accompanying drawings, best mode embodiments of the present invention will be described.

Figure 1:
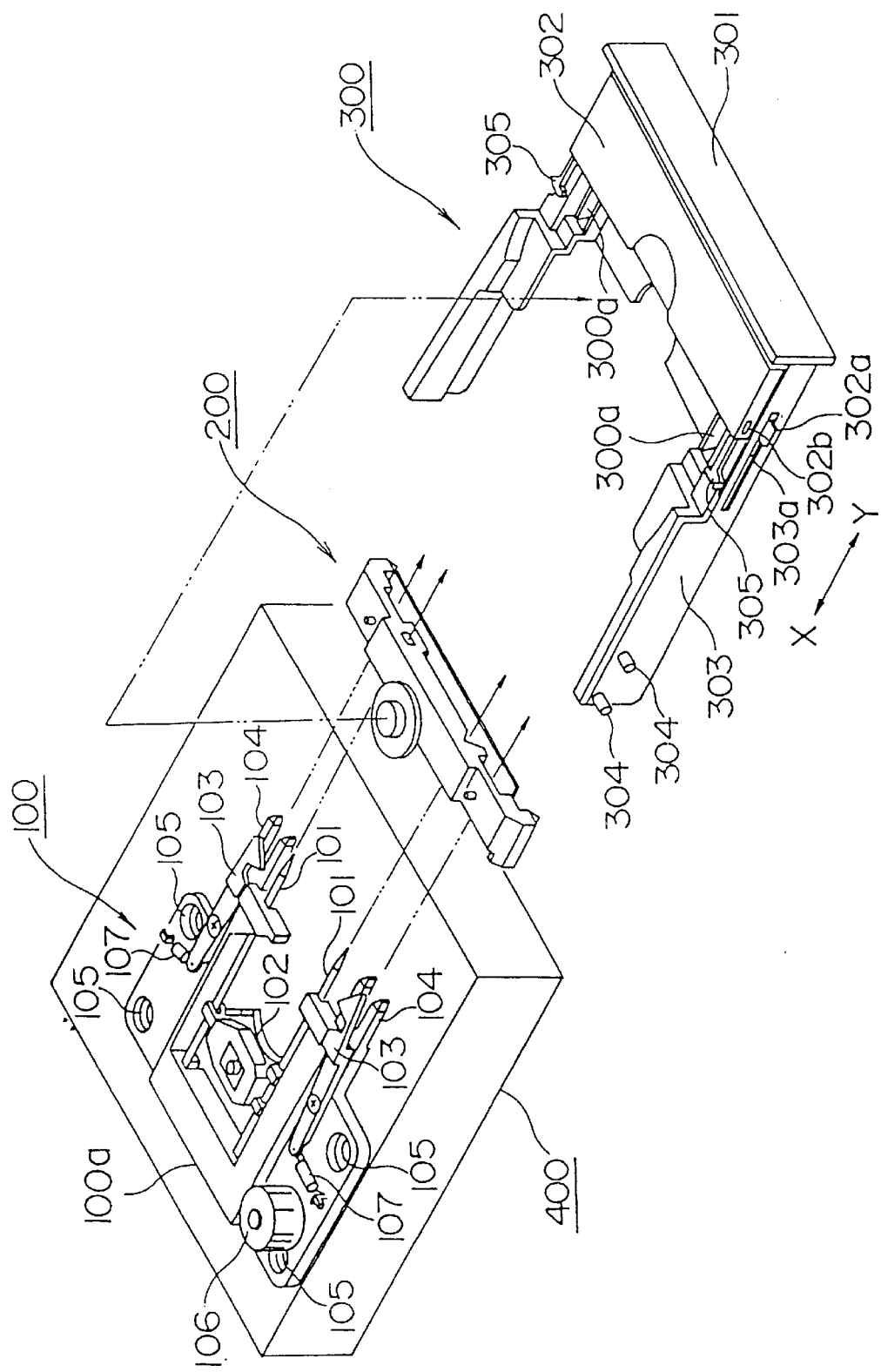
FIG. 1 is a perspective view showing the overall construction of a disc reproducing apparatus according to the present invention.
Figure 2:
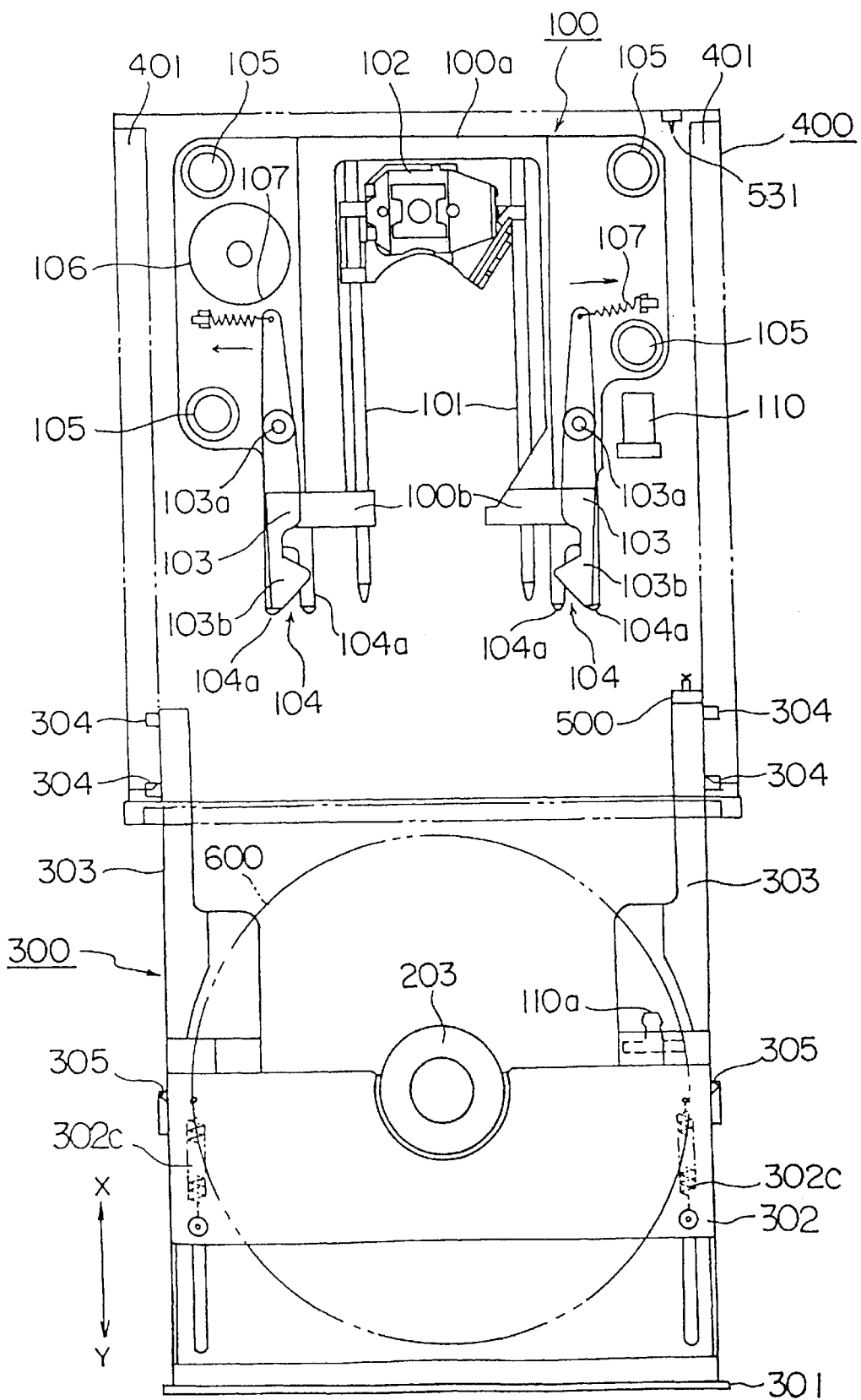
FIG. 2 is a plan view showing the disc reproducing apparatus of FIG. 1.

FIG. 1 is a perspective view showing the overall construction of a disc reproducing apparatus according to the present invention. FIG. 2 is a plan view of FIG. 1.

As shown in these drawings, the disc reproducing apparatus comprises a chassis 100, a motor unit 200, a tray 300, and a cabinet 400.

The chassis 100 has a sub-chassis 100a on which a variety of parts are mounted. A pair of guide shafts 101, 101 that extend in parallel are supported by the sub-chassis 100a. First edge portions of the guide shafts 101, 101 pierce guide shaft support portions 100b, 100b (see FIG. 2) and protrude to the front side of the chassis 100. The edge portions of the guide shafts 101, 101 that protrude from the guide shaft support portion 100b are nearly formed in circular cone shapes. A pickup 102 is hung between the guide shafts 101, 101 and supported thereby. The pickup 102 is movable in arrow directions X–Y along the guide shafts 101, 101.

In addition, the chassis 100 has a pair of lock levers 103, 103 and a pair of guide protrusions 104, 104. The lock levers 103, 103 have respective hooks 103b, 103b at edge portions on the front side. The lock levers 103, 103 are rotatably supported on the sub-chassis 100a through rotating shafts 103a, 103a secured thereto. The lock levers 103, 103 are rotationally tensioned by springs 107, 107 so that the distance between the hooks 103b, 103b decreases. The guide protrusions 104, 104 have respective two-branched nails 104a, 104a. The nails 104a, 104a have tapered surfaces at upper, left, and right edge portions thereof.

Four damper rubbers 105, . . . are disposed at corner portions of the sub-chassis 100a. The damper rubbers 105, . . . shut out and attenuate vibration that is transmitted from the cabinet 400 to the sub-chassis 100a. In addition, the chassis 100a has a feed motor 106 that drives a pickup.

When the tray 300 is unleaded from the cabinet 400, the motor unit 200 is held by two cavity portions 300a, 300a of the tray 300. When the tray 300 is loaded in the cabinet 100, the motor unit 200 is held by a holding portion. The holding portion is composed of the guide shaft 101, 101, the lock levers 103, 103, and the guide protrusions 104, 104 of the mecha-unit 100.

The tray 300 has the two cavity portions 300a, a front panel 301, and a shutter 302. The two cavity portions 300 hold the motor unit 200. Reinforced plates 303 of the tray 300 have a plurality of guide pins 304, 304 that protrude. The guide pins 304, 304 are inserted into guide grooves (not shown) formed on each side wall of the cabinet 400. Since the guide pins 304, 304 engage with the guide grooves, the tray 300 can move in the arrow directions X–Y. Thus, the tray 300 can be unloaded and loaded from and into the cabinet 400.

The shutter 302 has guide protrusions 302a, 302a on both sides. The guide protrusions 302a, 302 are inserted into the guide grooves 303a, 303a of the two reinforced plates 303, 303, which compose side walls of the tray 300. By the guide protrusions 302a, 302 and the guide grooves 303a, 303a, the shutter 302 can move between a first position and a second position in the arrow directions X–Y. At the first position, the shutter 302 covers the upper surface of the motor unit 200 held on the tray 300. At the second position, the upper surface of the motor unit 200 is exposed.

The shutter 302 is tensioned by two springs 302c, 302c so as to the shutter 302 is moved in the arrow direction X (from the second position to the first position). The force of each of the springs 302c, 302c is applied so that when the tray 300 is unloaded from the cabinet 400, the shutter 302 is placed at the first position, where the shutter 302 covers the upper surface of the motor unit 200. When the tray 300 is placed at the first position, lock members 305, 305 formed on the respective reinforced plates 303, 303 engage with lock holes 302b, 302b formed on both side surfaces of the shutter 302. Thus, when the shutter 302 is placed at the first position, the opening and closing of the shutter 302 is locked. Consequently, the user cannot manually open the shutter 302 so as to adversely remove the motor unit 200 from the tray 300. The construction of the shutter lock mechanism will be described later.

As shown in FIG. 2, in the cabinet 400, a tray lock device 110 that secures the inserted tray 300 at a predetermined position of the cabinet 400 is disposed. When the tray lock device 110 is connected to a striker 110a secured to the tray 300, the tray 300 is secured to the predetermined position in the cabinet 400. The tray lock mechanism including the tray lock device 110 will be described later.

In addition, a socket 531 is disposed on a deeper wall surface of the cabinet 400. When the tray 300 is loaded into the cabinet 400, the socket 531 is connected to a connector 500 mounted at an edge of one of the reinforced plates 303 of the tray 300. The socket 531 and the connector 500 will be described later.

Next, each portion of the disc reproducing apparatus will be described in detail.

Figure 3:
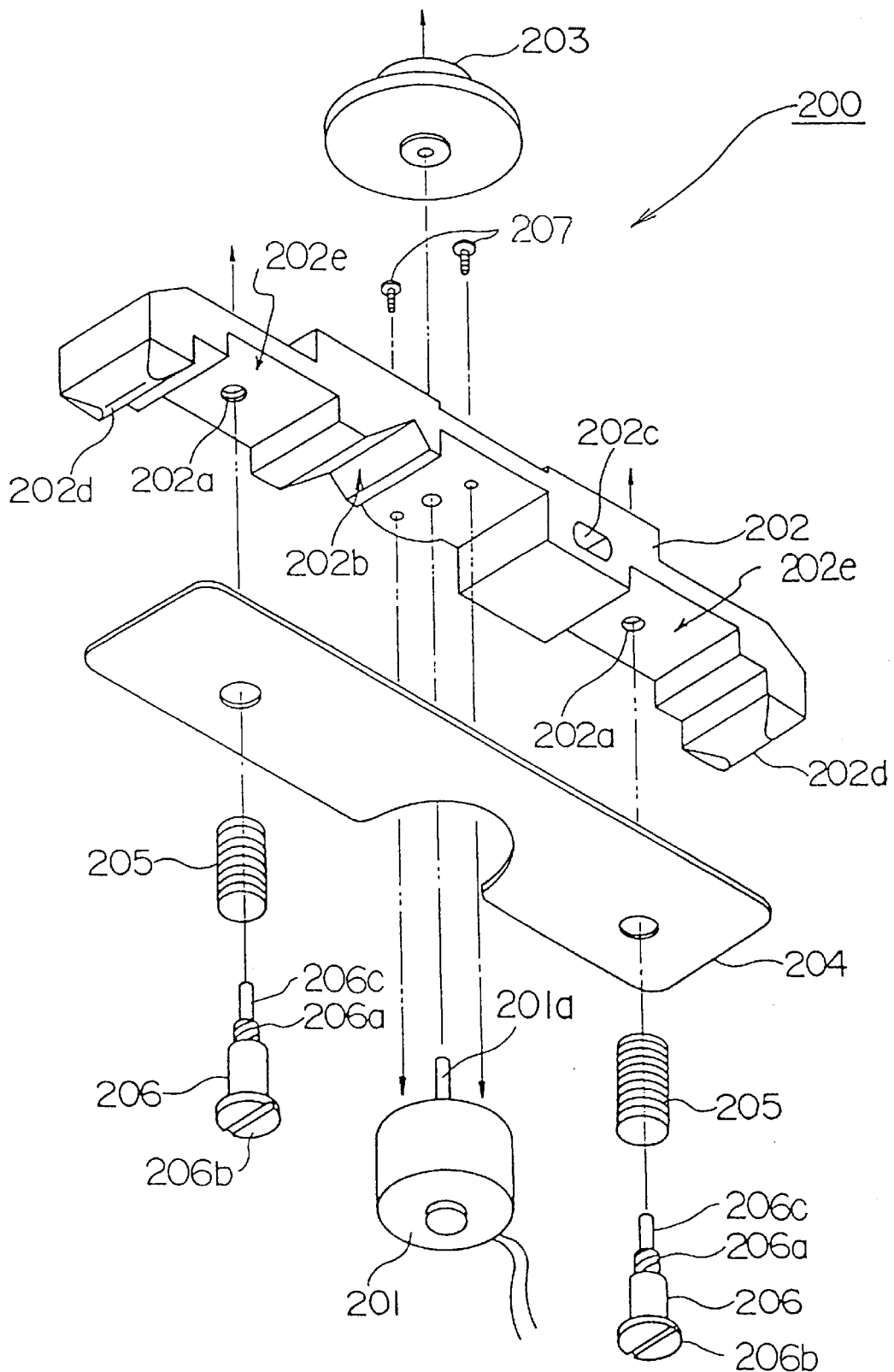
FIG. 3 is an exploded view showing a motor mount.

FIG. 3 is an exploded view showing the motor unit 200.

As shown in the drawing, the motor unit 200 comprises a disc motor 201, a motor block 202, a turn table 203, a magnetic plate 204, two springs 205, 205, and two pins 206, 206. The disc motor 201 is secured to the motor block 202 with two machine screws 207, 207. The turn table 203 is secured to a rotating shaft 201a of the disc motor 201. The magnetic plate 204 is secured to the motor block 202 with two pins 206, 206. Thread ridge portions are formed at the middle portions of the pins 206, 206. The thread ridge portions 206a, 206a are inserted into two thread hole portions 202a, 202a and secured. The springs 205, 205 are mounted on the outer peripheries of the pins 206, 206. The springs 205, 205 are held between head portions 206b, 206b of the pins 206, 206 and the magnetic plate 204. Edge portions 206c, 206c of the pins 206, 206 protrude from the opposite surface of the motor block 202. The protrusion portions 206c, 206c of the pins 206, 206 fit into hooks 103b, 103b of the lock levers 206, 206.

The motor block 202 has two cavities 202e, 202e that form two space portions (guide holes) that extend in the unloading and loading directions of the tray 300. The space portions are formed of the motor block 202 and the magnetic plate 204. When the tray 300 is loaded into the cabinet 400, the guide protrusions 104, 104 of the chassis 100 are inserted into the two guide holes.

The motor block 202 has a V groove 202b and an elliptic hole 202c into which edge portions (protrusion portions of the guide shaft support portion 100b) of the two guide shafts 101, 101 are inserted. The V groove 202b has a V-letter sectional shape so that the motor block 202 can be precisely aligned to the guide shaft 101. Entrance portions of the V groove 202b and the elliptic hole 202c are tapered so that the guide shafts 101, 101 can be smoothly inserted thereinto. As long as the guide shaft 101 can be guided into a predetermined position of the groove 202b, the shape of the section of the groove 202b may be not limited to the V letter shape, but any shape such as semi-circular shape.

Moreover, the motor block 202 has leg portions 202d, 202d at both the edge portions. The leg portions 202d, 202d are inserted into the two cavity portions 300a, 300a formed on the tray 300. When the leg portions 202d, 202d are inserted into the cavity portions 300a, 300a, the motor unit 200 can be held at a predetermined position of the tray 300.

Figure 4A:
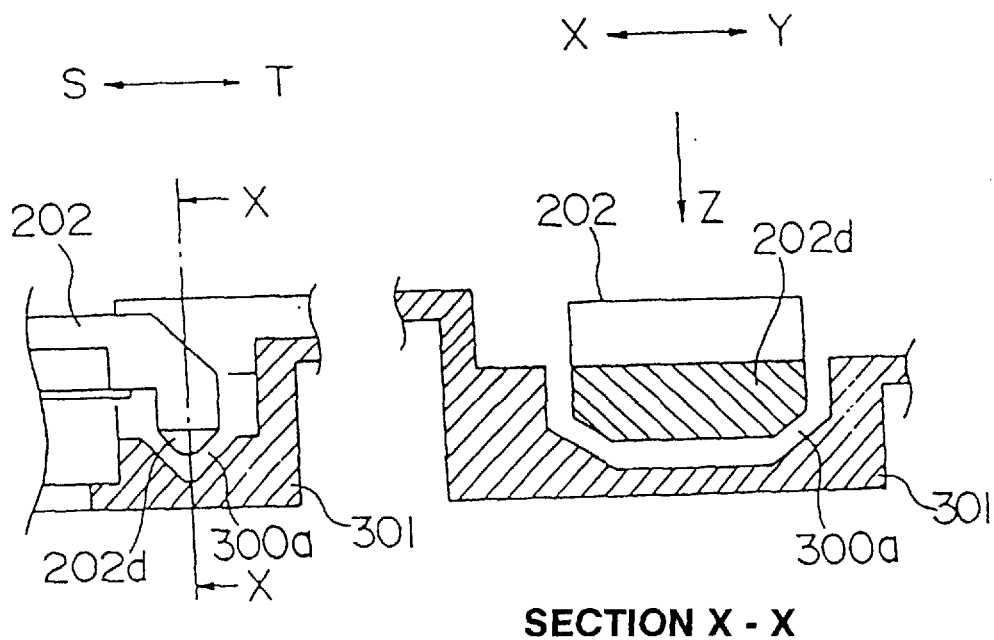
FIG. 4A is a sectional view showing the state in which a leg portion disposed on a motor block shown in FIG. 3 and a cavity portion formed on a tray have not been connected.
Figure 4B:
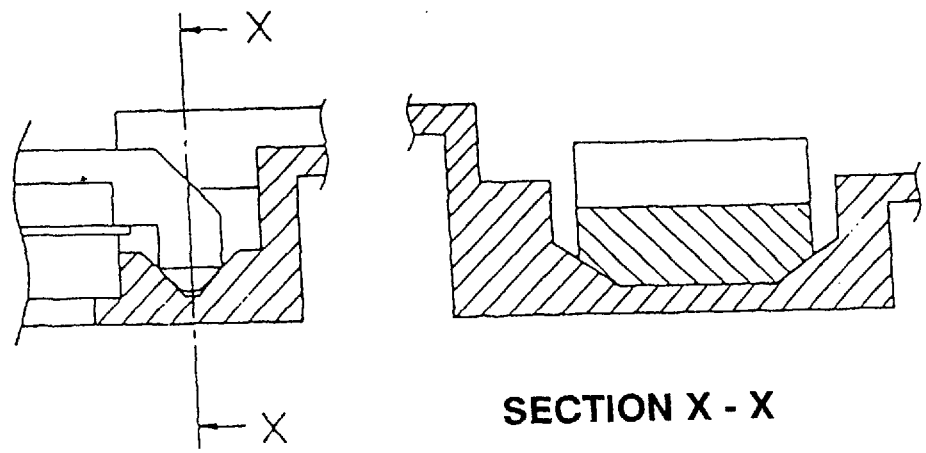
FIG. 4B is a sectional view showing the state in which the leg portion and the cavity portion that have been connected.

FIG. 4A is a schematic diagram showing the leg portion 202d and the cavity portion 300a that have not been connected. FIG. 4B is a schematic diagram showing the leg portion 202d and the cavity portion 300a that have been connected.

As shown in these drawings, the cavity portion 300a of the tray 300 has four tapered surfaces for guiding the inserted leg portion 202d to the predetermined position in the cavity portion 300a. On the other hand, the leg portion 202d of the motor block 202 has four tapered surfaces that contact the tapered surfaces of the cavity portion 300a. The size of the opening surface and the bottom surface of the cavity portion 300a is larger than the size of the leg portion 202d. The difference of the size of these surfaces is necessary as a margin for which the leg portions 202d, 202d are inserted into the cavity portions 300a, 300a. When the leg portions 202d, 202d are inserted into the cavity portions 300a, 300a, even if the positions thereof deviate to some extend, due to guiding operation of the tapered surfaces, the leg portions 202d, 202d drop to the predetermined positions of the cavity portions 300a, 300a.

When the motor unit 200 is held on the chassis 100 side, as shown in FIG. 4B, the leg portions 202d, 202d are placed at positions where they slightly float from the cavity portions 300a, 300a. Thus, the tray 300 and the motor unit 200 do not contact with each other. Consequently, vibration is not transmitted from the tray 300 to the motor unit 200.

When the motor unit 200 is held on the chassis 100 side, the motor unit 200 is supported by the cabinet 400 through the damper rubbers 105, . . . along with the chassis 100. Thus, in the disc reproducing apparatus, while the motor unit 200 is held on the chassis 100 side, the transmission path of vibration from the outside to the motor unit 200 can be nearly perfectly shut out.

Figure 5A:
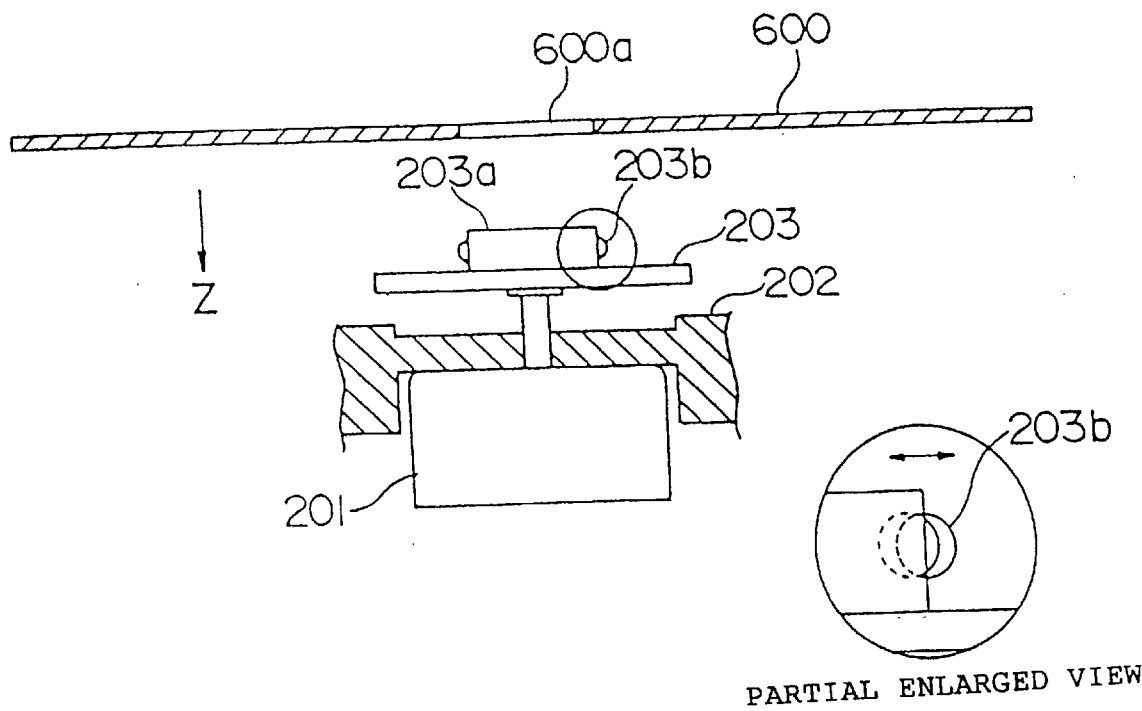
FIG. 5A is a schematic diagram for explaining the construction of a turn table on which a disc has not been mounted.
Figure 5B:
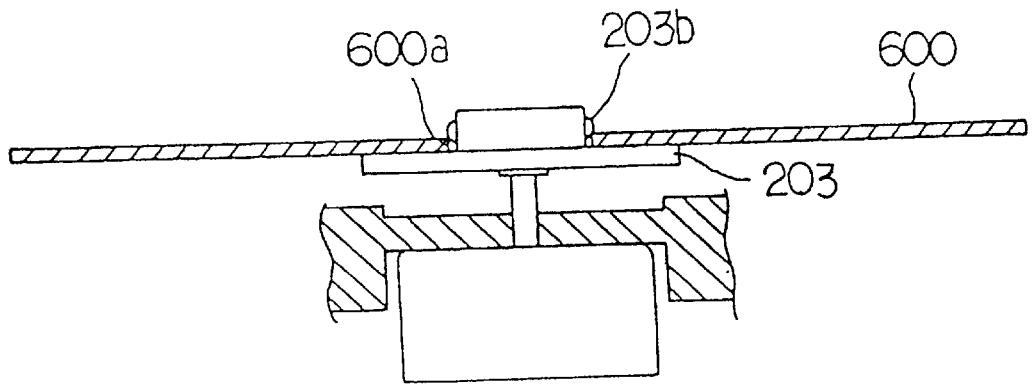
FIG. 5B is a schematic diagram for explaining the construction of the turn table on which the disc has been mounted.

Next, with reference to FIGS. 5A and 5B, the turn table 203 will be described in detail. FIG. 5A shows the state that the disc 600 has not been mounted on the turn table 203. FIG. 5B shows the state that the disc 600 has been mounted on the turn table 203.

The turn table 203 has a disc chuck 203a that is connected to a center hole 600a of the disc 600. A plurality of balls 203b, . . . are embedded at an outer peripheral portion of the disc chuck 203a in such a manner that the balls 203b are partially exposed. The balls 203b are held in the disc chuck 203 so that they move between a position denoted by a solid line in an enlarged view of FIG. 5A and a position denoted by a dashed line thereof. The balls 203b, . . . are tensioned by springs (not shown) in the disc chuck 203a so that the balls 203b are pushed out from the center of the disc chuck 203a to the outer periphery.

When the disc 600 is mounted on the turn table 203, the balls 203b, . . . contact the inner wall of a center hole 600a of the disc 600. Thus, since the balls 203b are pressured from the outside, they are temporarily moved to the position denoted by the dashed line. When the disc 600 is placed at the predetermined position on the turn table 203, the balls 203b, . . . are pushed out to the outside by the force of the springs. Thus, as shown in FIG. 5B, the disc 600 is downwardly pressed by the balls 203b, . . . and secured on the turn table 203.

Figure 6A:
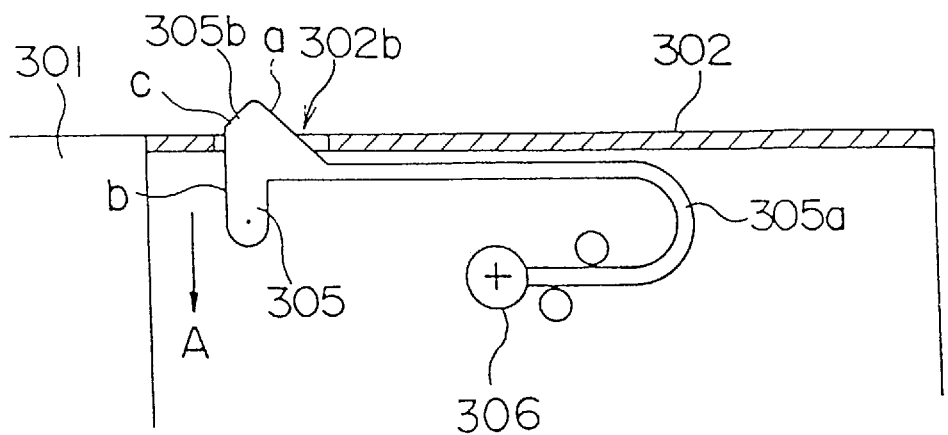
FIG. 6A is a plan view showing a shutter lock mechanism in lock state.
Figure 6B:
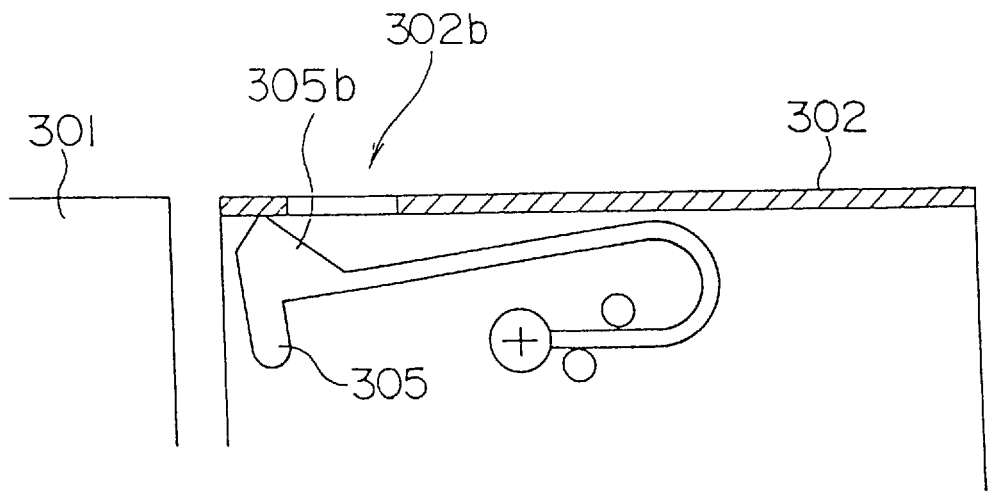
FIG. 6B is a plan view showing the shutter lock mechanism in unlock state.

Next, with reference to FIGS. 6A and 6B, the shutter lock mechanism will be described. FIG. 6A shows the shutter lock mechanism in the lock state. FIG. 6B shows the shutter lock mechanism in the unlock state.

The lock members 305, 305 disposed on the reinforced plates 303, 305 of the tray 300 are made of for example mold elastic members. As shown in FIG. 6, one edge portion of the lock member 305 is secured to the tray 300 with a machine screw 306. The lock member 305 has a protrusion 305b that is inserted into the lock hole 302b formed on the shutter 302. In addition, the lock member 305 has a curved portion 305a that has a U-letter shape. The curved portion 305a is formed at a middle portion of the lock member 305.

Next, the operation of the shutter lock mechanism will be described. When the tray 300 is unloaded from the cabinet 400, as shown in FIG. 6A, the protrusion 305b of the lock member 305 is inserted into the lock hole 302b. Thus, the opening and closing of the shutter 302 is locked.

When the opening/closing of the shutter 302 is unlocked, the edge of the protrusion 305b of the lock member 305 is pressed in an arrow direction A. The lock member 305 is elastically deformed until at least a surface c of the protrusion 305b comes to contact with a surface of the lock hole 302. After the surface c of the protrusion 305b comes in contact with the surface of the lock hole 302b, when the shutter 302 is moved in an arrow direction Y, the lock member 305 is elastically deformed and thereby the protrusion 305b is pushed in the tray 300. Thus, as shown in FIG. 6B, the protrusion 305b of the lock member 305 is disengaged from the protrusion 305b and the shutter 302 is unlocked.

Figure 7A:
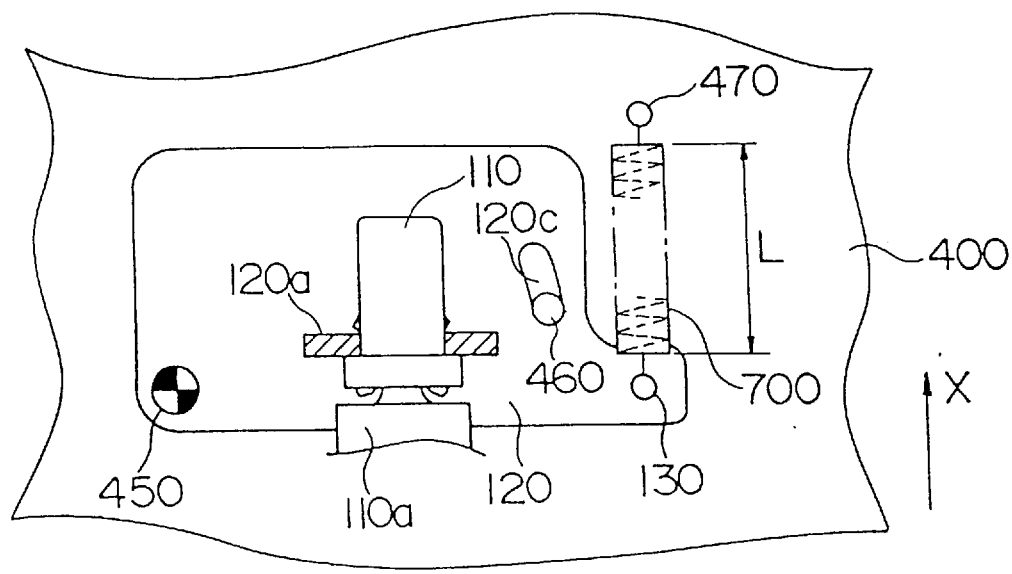
FIGS. 7A and 7B are plan views showing the construction of the tray lock mechanism.
Figure 7B:
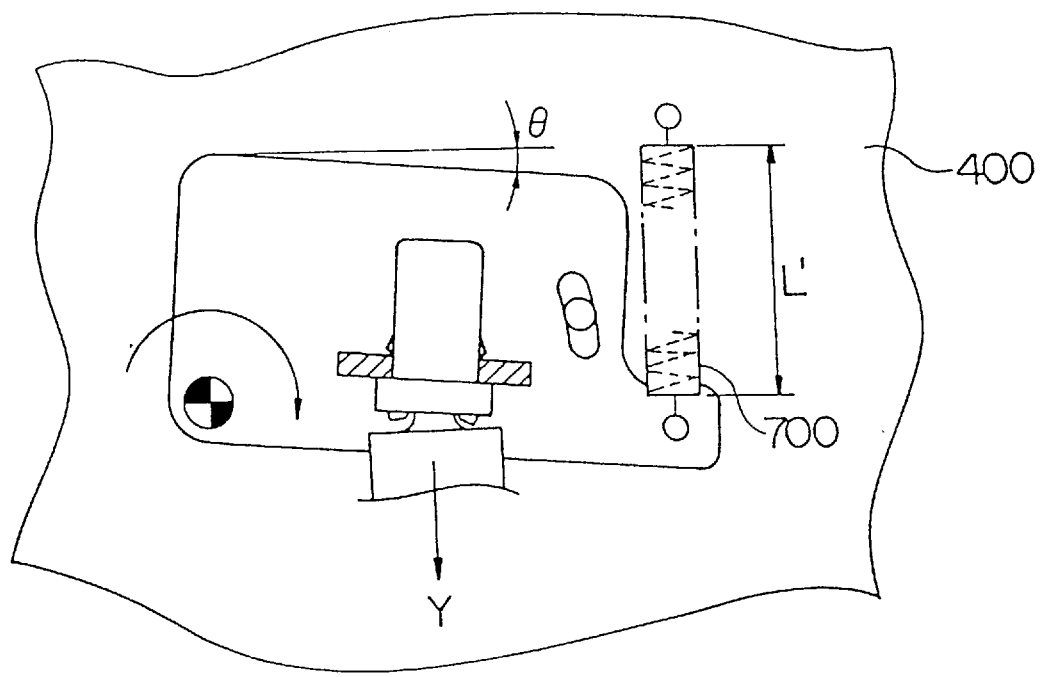

Next, the above-described tray lock mechanism will be described in detail. FIGS. 7A and 7B are schematic diagrams showing the construction of the tray lock mechanism.

In these drawings, reference numeral 110 is a tray lock device disposed in the cabinet 400. Reference numeral 110a is a striker secured to the tray 300. The tray lock device 110 is secured on the slider 120 through a mounting portion 120a. The slider 120 is rotatably supported by the cabinet 400 through a rotating shaft 450. The rotating range of the slider 120 is limited by a pin 460 secured to the cabinet 400 and an oval hole 120c formed on the slider 120. An edge portion of the slider 120 is connected to one edge of a spring 700. The other edge of the spring 700 is supported by a pin 470 secured to the cabinet 400. In other words, force that causes the slider 120 to be rotated about a rotating shaft 450 in an arrow direction X is applied by the spring 700. Since the rotating range of the slider 120 is limited by the pin 460 and the oval hole 120c, the slider 120 is kept in a state shown in FIG. 7A by tensile force of the spring 700

FIG. 7B shows the state that a large shock is applied to a tray lock device 110 through the tray 300. At this point, if a shock that is larger than the tensile force of the spring 700 is applied to the tray lock device 110, the spring 700 temporally expands for L'–L and the slider 120 rotates by an angle θ. Thus, the peak value of the shock force applied to the tray lock device 110 decreases, thereby preventing the tray lock device 110 from being damaged. In this case, when the slider 120 contacts the surface of the cabinet 400, the shock can be further absorbed due to the frictional effect. In addition, a member with a large frictional resistance such as rubber can be disposed between the slider 120 and the cabinet 400.

Figure 8A:
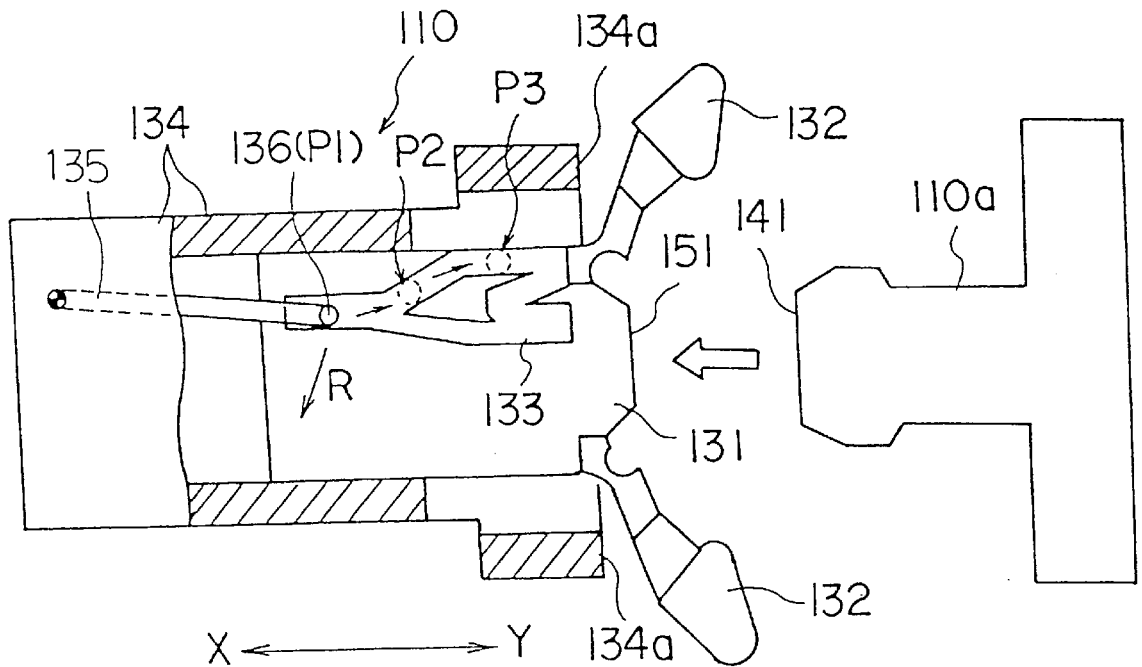
FIG. 8A is a schematic diagram for explaining the construction of a tray lock device in the state that the tray has been unlocked.
Figure 8B:
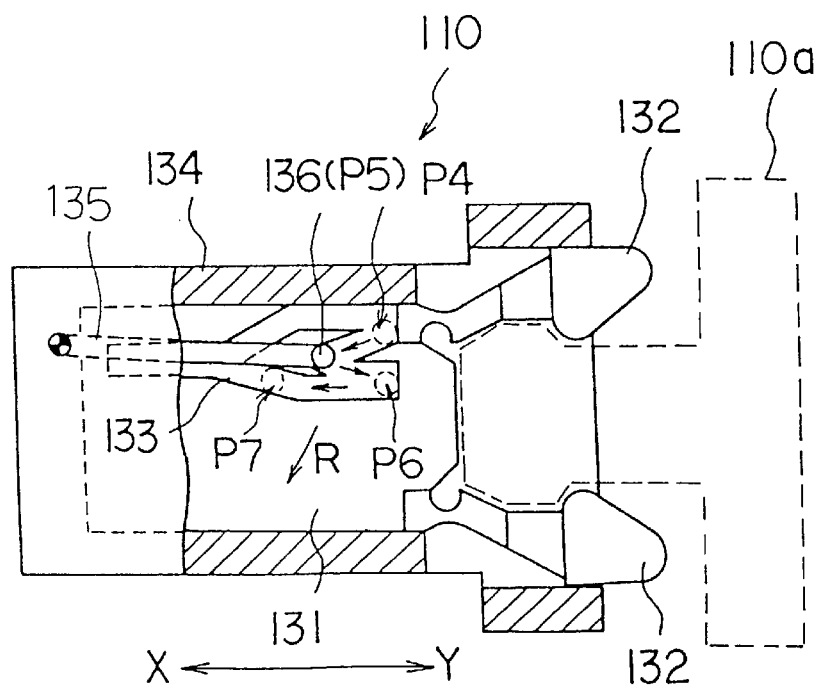
FIG. 8B is a schematic diagram for explaining the construction of the tray lock device in the state that the tray has been locked.

FIGS. 8A and 8B are detailed schematic diagrams showing the tray lock device. FIG. 8A shows the tray lock device in the state that the tray has been unlocked. FIG. 8B shows the tray lock device in the state that the tray has been locked.

As shown in FIGS. 8A and 8B, the tray lock device 110 contains a lock slider 131 that is movable in arrow directions X–Y. The lock slider 131 is tensioned by a spring (not shown) in the arrow direction Y. When the tray lock device is in the unlocked state, the lock slider 131 is placed at a position shown in FIG. 8A. The lock slider 131 has a pair of arms 132, 132 that hold an edge portion of the striker 110a. A guide groove 133 is formed on the front surface of the lock slider 131. A pin 136 of a member 135 rotatably supported by a main body 134 of the tray lock device 110 is inserted into the guide groove 133. The member 135 is tensioned by a spring (not shown) so that the member 135 is rotated in an arrow direction R.

Next, the operation of the tray lock device 110 will be described. When the tray 300 is locked, the edge portion 141 of the striker 110a comes in contact with an opposed surface 151 of the lock slider 131. The lock slider 131 is pushed in the tray lock device 110 (main body 134) by the pressure of the striker 110a. As the lock slider 131 is pushed in the main body 134, the arms 132, 132 rotate in such a manner that their distance decreases. At the same time, the pin 136 inserted into the guide groove 133 moves from a position P1 to a position P2, to a position P3. When the tray 300 has been fully inserted into the cabinet 400, as shown in FIG. 8B, the striker 110a is held by the arms 132, 132. At this point, the pin 136 is placed at a position P4. Thereafter, when the user detaches his (her) fingers from the tray 300, the lock slider 131 is slightly returned in the arrow direction Y by the force of a spring (not shown) and thereby the pin 136 moves to a position P5. Thus, the tray has been locked.

To unlock the tray, the tray 300 is pushed in the arrow direction X. Thus, the pin 136 moves from the position P5 to a position P6. When the pin 136 is placed at the position P6, when the user detaches his (her) fingers from the tray 300, the lock slider 131 is popped out in the arrow direction Y by the force of a spring (not shown). Thus, the arms 132, 132 are rotated in such a manner that their distance decreases. At the same time, the striker 110a is pushed out in the arrow direction Y. At this point, the pin 136 is returned from the position P6 to the original position P1 through a position P7. Thus, the tray is unlocked.

Figure 9:
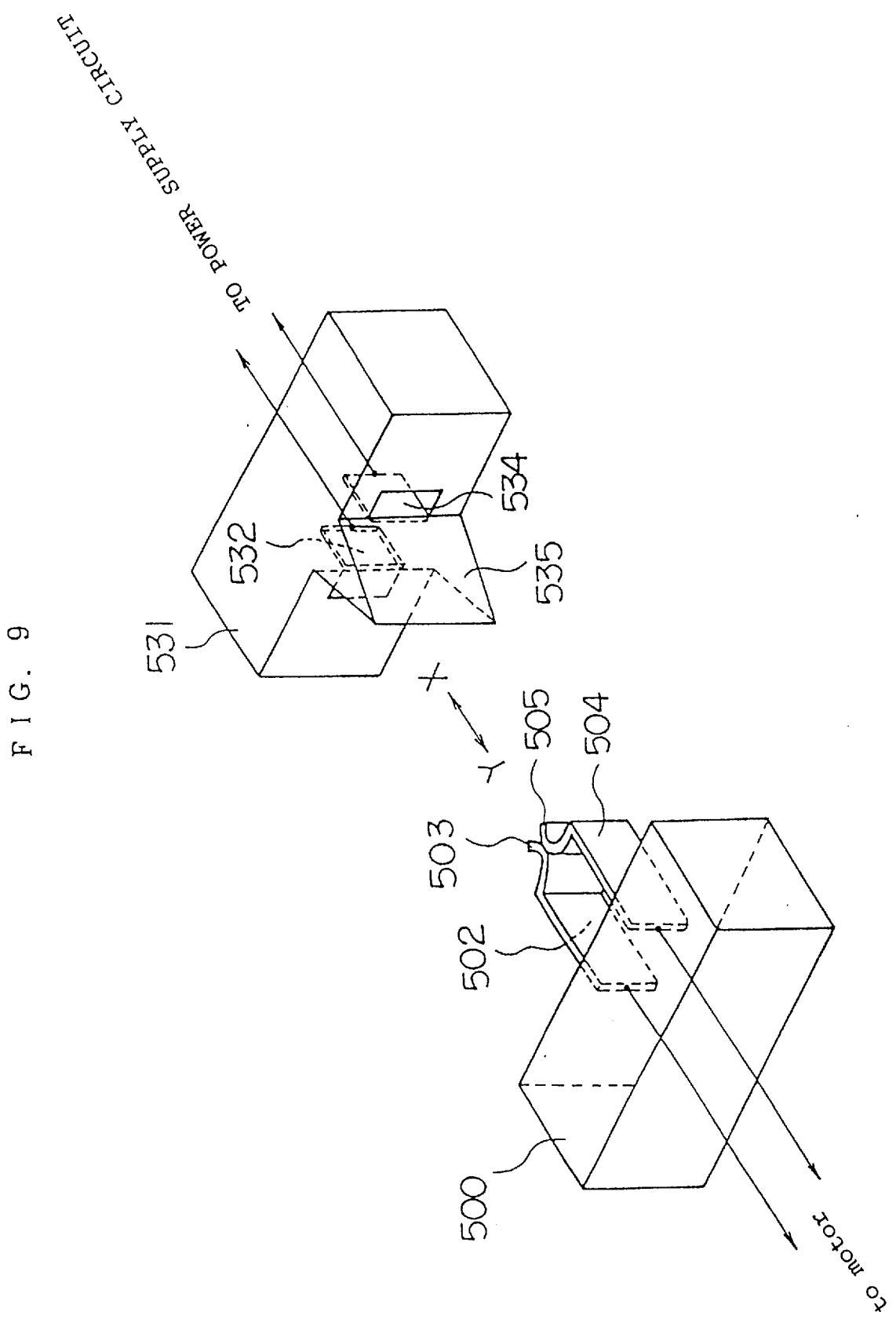
FIG. 9 is a perspective view showing the construction of an electric connecting portion between the tray and the cabinet.

Next, with reference to FIG. 9, the socket 531 and the connector 500 will be described in detail. As shown in the drawing, a connector 500 mounted on the tray 300 has a pair of electrode plates 502, 504 that have characteristics as leaf springs. The electrode plates 502, 504 are raised and secured in such a manner that their surfaces face each other and edge portions thereof face a surface of the connector 500. The electrode plates 502, 504 are connected to power lines (plus electrode and minus electrodes) that supply drive power to the disc motor 201. At edge portions of the electrode plates 502 and 504, curved portions 503, 505 that are symmetrically curved each other are formed. When the socket 531 and the connector 500 are not connected, center portions of the curved portions 503, 505 contact each other due to their elastic force.

The socket 531 has a pair of contacts 532, 534 that are connected to the electrode plates 502, 504, respectively. The contacts 532, 534 are connected to power lines (plus electrode and minus electrode) that are connected to a power supply circuit (not shown) in the cabinet 400. The socket 531 has an insulating protrusion 535. When the tray 300 is loaded into the cabinet 400, the insulating protrusion 535 is inserted into the space between the electrode plates 502, 504 through the curved portions 503, 505 of the electrode plates 502, 504, respectively. Thus, the insulating protrusion 535 widen the space between the electrode plates 502, 504 and guides the edge portions of the curved portions 503, 505 to the contacts 532, 534, respectively.

When the tray 300 is unloaded from the cabinet 400, the edge portions (curved portions 503, 505) of the electrode plates 502, 504 of the connector are separated from the contacts 532, 534, respectively, and thereby the power supply of the drive power is stopped. For a while, after the drive power to the disc motor 201 is stopped, the disc motor 201 still rotates due to its inertia force. During this, the curved portions 503, 505 of the electrode plates 502, 504 of the connector 500 are not contacted by the insulating protrusion 535. Thereafter, the tray 300 is pulled out, the curved portions 503, 505 of the electrode plates 502, 504 of the connector 500 are detached from the insulating protrusion 535. Thus, the center portions of the curved portions 503, 505 of the electrode plates 502, 504 are contacted and thereby the power lines connected to the disc motor 201 are short-circuited. At this point, a counter electromotive force takes place in the disc motor 201 that is rotating due to the inertia force. Thus, the rotation of the disc motor 201 is forcedly stopped. Consequently, in the disc reproducing apparatus, when the tray 300 is fully unloaded from the cabinet 400, since the disc motor 201 has stopped. As a result, when the disc 600 is unloaded from the tray 300, the disc 600 and the like can be prevented from being damaged.

Other than the lines that supply power to the disc motor 201, the disc reproducing apparatus does not have lines that electrically connect the tray side and the cabinet side. In other words, since the tray 300 does not have electric devices other than the disc motor 201, the electric connections between the tray side and the cabinet side are only the lines that supply drive power from the power supply circuit disposed in the cabinet 400 to the disc motor 201. Thus, the flexible cable is not required. Consequently, when the tray 300 is loaded into the cabinet 400, it is not necessary to provide the space for the flexible cable in the cabinet 400. As a result, the size of the cabinet 400 can be reduced.

In addition, since the lines that supply the drive power from the power supply circuit to the disc motor 201 are disconnected when the tray 300 is unloaded from the cabinet 400, it is not necessary to consider the radiation noise (undesired radiation) from the power lines. In other words, although a circuit board that has a clock generator that generates clock pulses for reading digital data is disposed as the undesired radiation source in the cabinet 400, when the tray 300 is unloaded from the cabinet 400, since the power lines are disconnected, the radiation noise (undesired radiation) does not take place from the power lines.

Next, the overall operation of the disc reproducing apparatus will be described.

FIG. 2 is a schematic diagram showing the state that the tray 300 has been unloaded from the cabinet 400. At this point, the upper surface of the motor unit 200 is covered with the shutter 302. In addition, at this point, the shutter 302 is locked by the shutter lock mechanism shown in FIG. 6 and thereby the shutter 302 is prohibited from being opened and closed.

Figure 10:
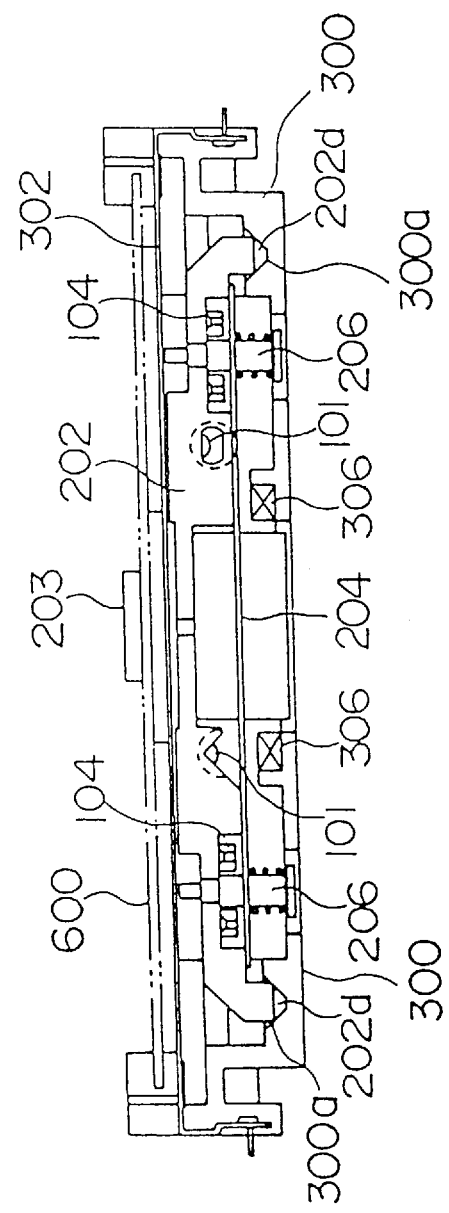
FIG. 10 is a front sectional view showing the disc reproducing apparatus of FIG. 2.

FIG. 10 is a front view showing the apparatus of FIG. 2. As shown in FIG. 10, at this point, the motor unit 200 is held by the cavity portions 300a, 300a of the tray 300. In addition, since the two magnets 306, 306 secured to the tray 300 downwardly attract the magnetic plate 204 of the motor unit 200, the motor unit 200 is stably held on the tray 300.

A point to be especially considered here is the relation of relative positions (height) of the guide shafts 101, 101, the guide protrusions 104, 104, and the motor block 202 of the chassis 100. In the state shown in FIG. 10, the height of each of the guide shafts 101, 101, and the guide protrusions 104, 104 is larger than the height of each of the V groove 202b and elliptic hole 202c of the motor block 202, and a space (hole) formed of the motor block 202 and the magnetic plate 204.

Figure 11:
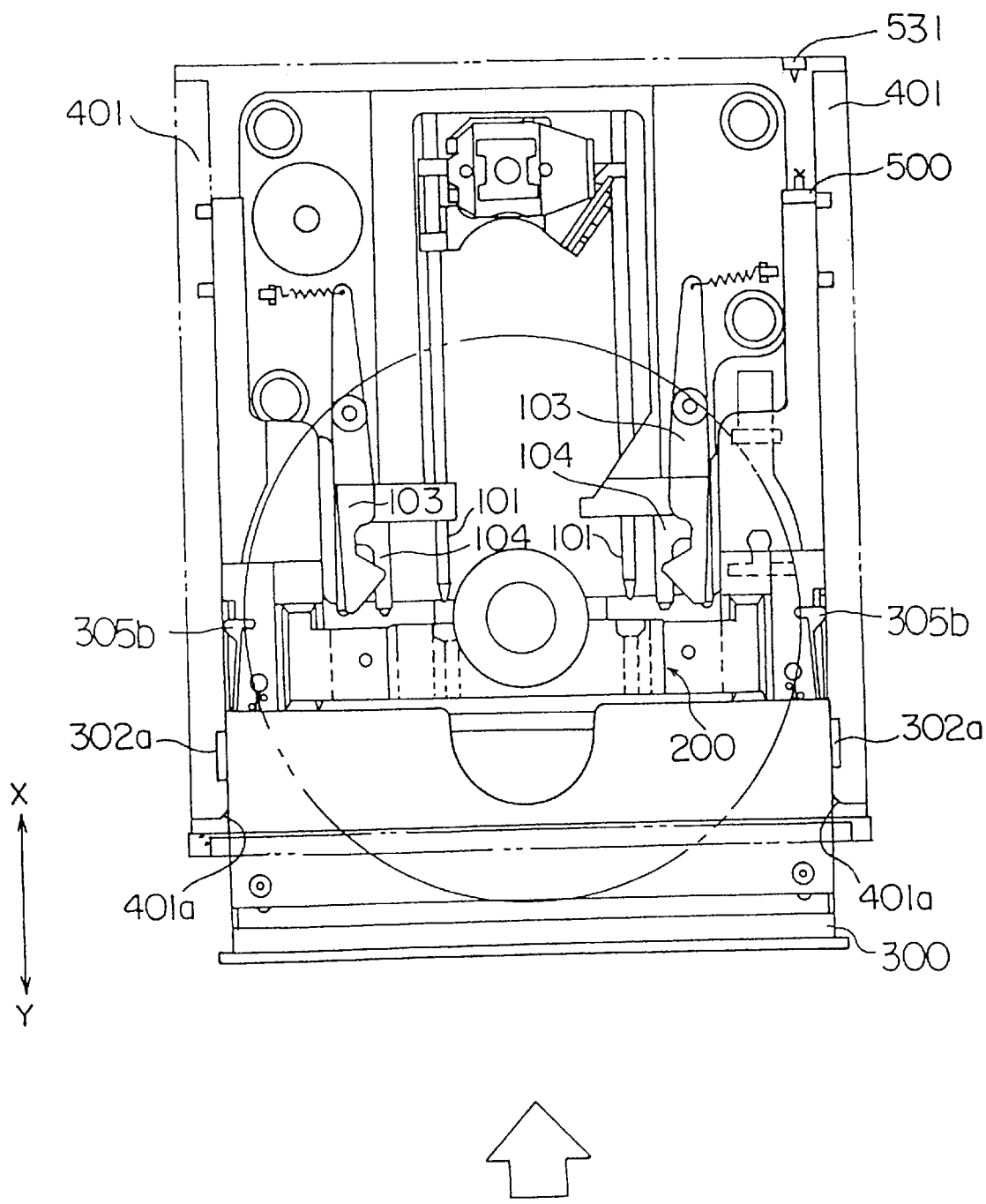
FIG. 11 is a plan view showing the disc reproducing apparatus in which a loading operation is being performed.

Thereafter, the tray 300 is manually pushed in the arrow direction X. FIG. 11 is a schematic diagram showing the state that the tray 300 is being loaded. As shown in the drawing, when the tray 300 is loaded into the cabinet 400 to some extent, the front surfaces of tray guides 401, 401 disposed on both side surfaces of the cabinet 400 come in contact with protrusions 305b, 305b of the lock members 305, 305 of the shutter lock mechanism and thereby the protrusions 305b, 305b are pushed in the tray 300. Thus, the shutter 302 is unlocked.

On the other hand, the protrusions 302a formed on both the side surfaces of the shutter 302 are inserted into sliders (not shown) supported through springs (not shown) in the tray guides 401 while the tray 300 is being loaded. When the tray 300 is pushed to the position shown in FIG. 11, the force of the springs is transmitted to the shutter 302 through the slider and thereby the shutter 302 is opened. In FIG. 11, the shutter 302 is fully opened and the motor unit 200 is exposed.

Figure 12:
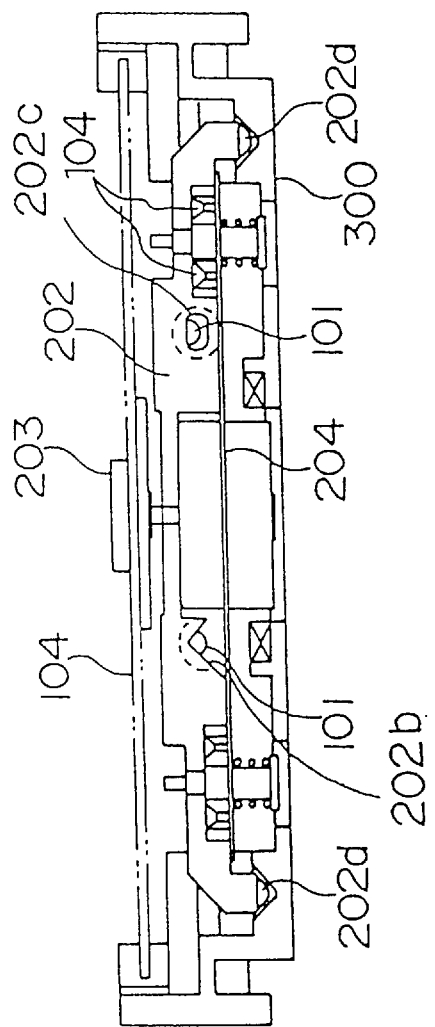
FIG. 12 is a front sectional view showing the disc reproducing apparatus in which the loading operation is being performed.

Thereafter, when the tray is more deeply pushed in the cabinet 400, as shown in FIG. 12, the edge portions (nails 104a, 104a) of the guide protrusions 104, 104 of the mecha-unit 100 are inserted into two space portions (holes) formed between the motor block 202 and the magnetic plate 204. When the guide protrusions 104, 104 are inserted into the holes, the difference of height between the guide protrusions 104, 104 and the holes is smoothly corrected with the tapered surfaces formed on the upper surfaces of the edge portions (nails 104a, 104a) of the guide protrusions 104, 104. Thus, the motor unit 200 is slightly raised from the cavity portions 300a, 300a of the tray 300.

In the state shown in FIG. 12, the guide shafts 101, 101 have not been inserted into the V groove 202b and the elliptical hole 202c of the motor block 202.

Figure 13:
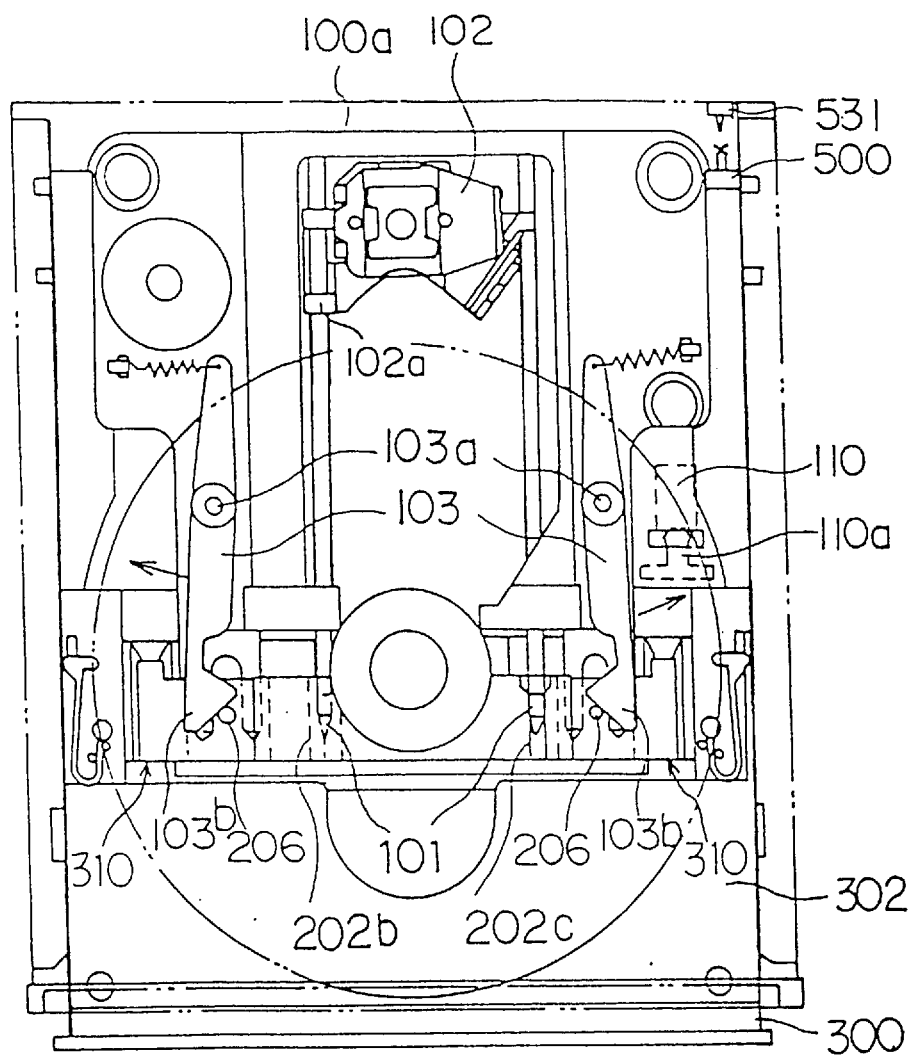
FIG. 13 is a plan view showing the disc reproducing apparatus in which the motor unit is being transferred to the chassis.
Figure 14:
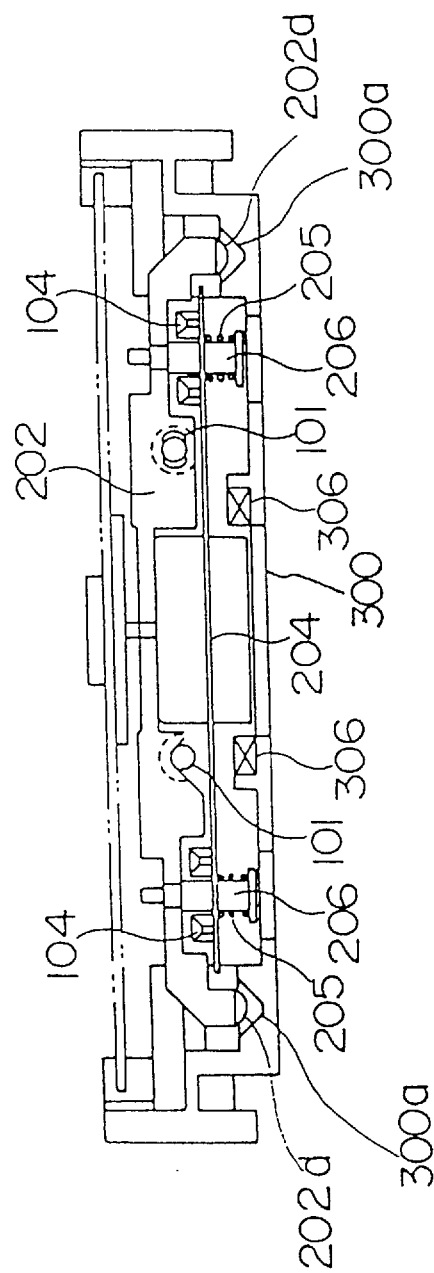
FIG. 14 is a front sectional view showing the disc reproducing apparatus of FIG. 13.

Thereafter, when the tray 300 is more deeply inserted into the cabinet 400, as shown in FIG. 13, the edge portions of the guide shafts 101, 101 are inserted into the V groove 202b and the elliptic hole 202c of the motor block 202. At this point, the upper edges of the guide shafts 101, 101 are slightly higher than the upper edges of the V groove 202b and the elliptic hole 202c of the motor block 202. Thus, when the guide shafts 101, 101 are inserted into the V groove 202b and the elliptic hole 202c of the motor block 202, as shown in FIG. 14, the leg portions 202d, 202d of the motor block 202 are more highly raised from the cavity portions 300a, 300a.

On the other hand, as shown in FIG. 13, two pins 206, 206, which protrude from the upper surface of the motor block 202, come in contact with first cam surfaces of the hooks 103b, 103b of the two lock levers 103, 103 disposed in the mecha-unit 100, thereby applying a pressure to the lock levers 103, 103. Thus, the lock levers 103, 103 are rotated in the arrow direction about the rotating shafts 103a, 103a. After this point, the striker 110a disposed on the tray 300 is entering the tray lock device 110.

Thereafter, the motor block 200 is pressed by two edge surfaces 310, 310 of the tray 300 and thereby the leg portions 202d, 202d of the motor block 202 are moved to the limit positions in the X direction of the cavity portions 300a, 300a. As shown in FIG. 4, since the length of the X–Y direction of the cavity portion 300a is larger than the length in the X–Y direction of the leg portion 202d, when the motor block 202 is pressed in the arrow direction X on the edge surfaces of the tray 300, the leg portions 202d, 202d can be moved in the arrow direction X in the cavity portions 300a, 300a for a predetermined length.

Figure 15:
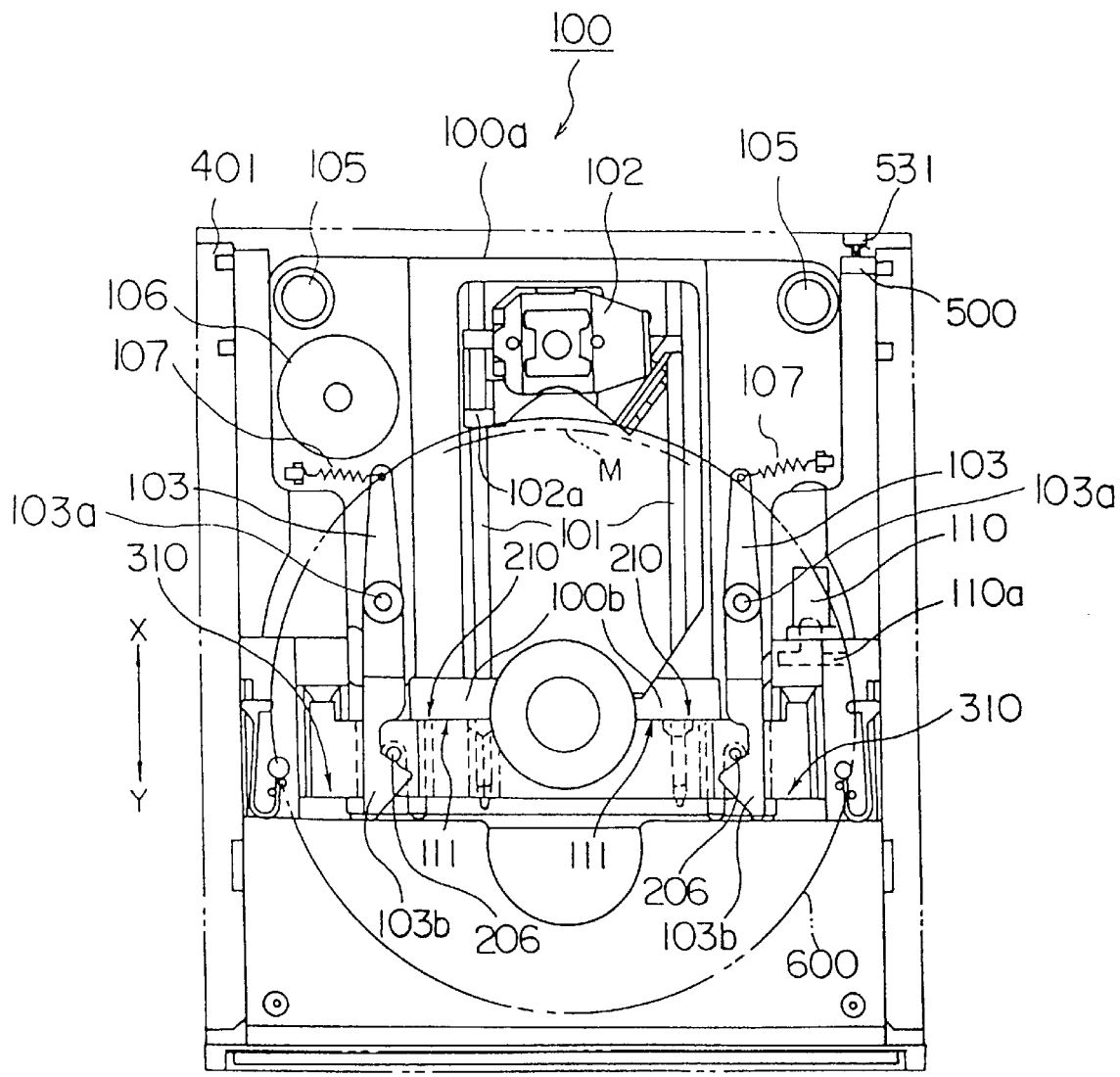
FIG. 15 is a plan view showing the disc reproducing apparatus in which the motor unit has been transferred to the chassis.

When the motor unit 200 is moved, the rotating angles of the lock levers 103, 103 increase. When the lock levers 103, 103 are rotated for predetermined angles, as shown in FIG. 15, the two pins 206, 206, which protrude from the upper surface of the motor unit 200 move across the first cams of the hooks 103b, 103b of the lock levers 103, 103 to second cams. Thus, the lock levers 103, 103 rotate in the reverse direction due to the pulling force of the springs 107, 107. With the rotating force of the lock levers 103, 103, the motor unit 200 is pulled toward the chassis 100. Thus, the motor unit 200 is moved until a wall surface 210 on the deeper side of the motor unit 200 comes in contact with the edge surface 111 of the guide shaft support portion 100b. Consequently, the motor unit 200 is aligned in the directions X–Y.

At this point, the motor unit 200 is held by the chassis 100 in such a manner that the motor unit 200 is vertically clamped by the guide shafts 101, 101 and the lock levers 103, 103. Thus, the motor unit 200 is aligned in the height direction.

Figure 16:
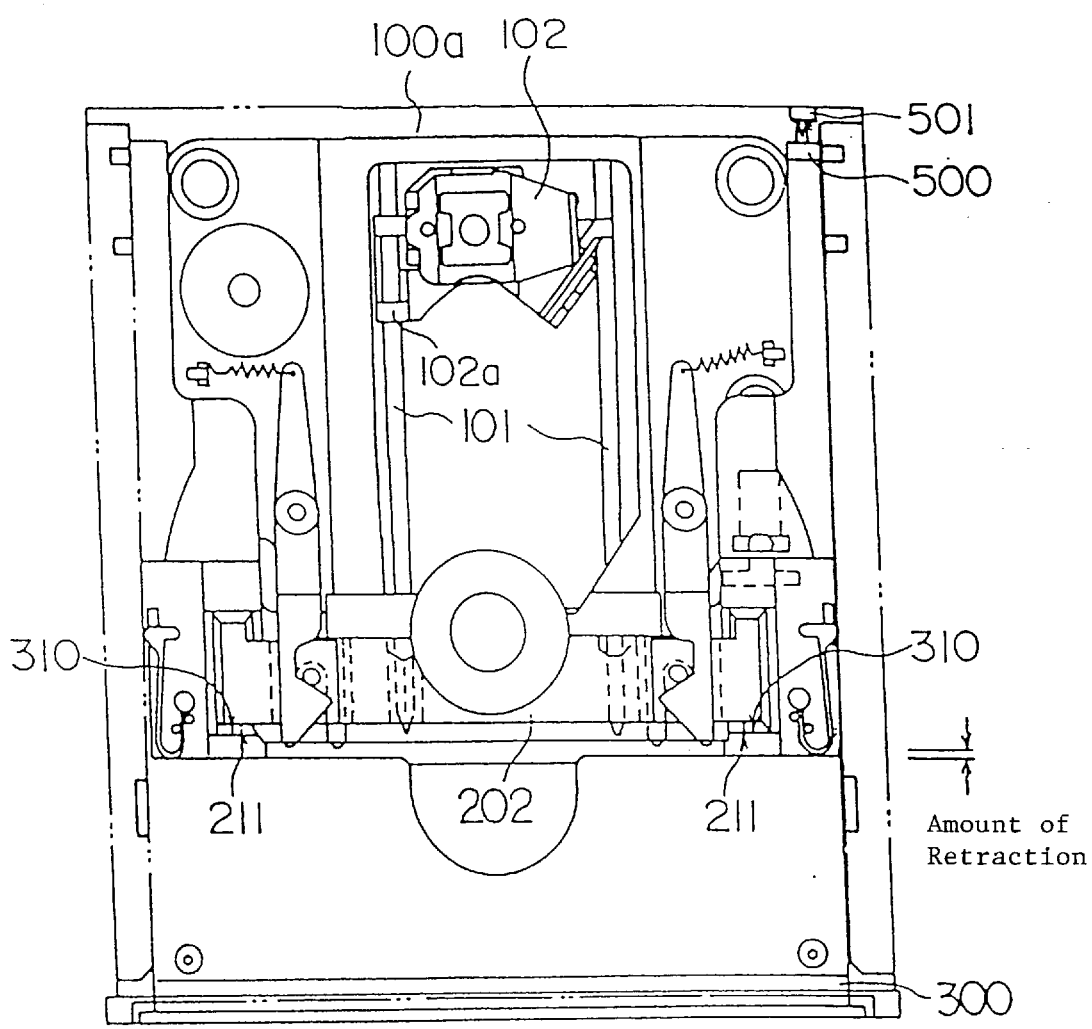
FIG. 16 is a plan view showing the disc reproducing apparatus in which the loading operation has been completed.
Figure 17:
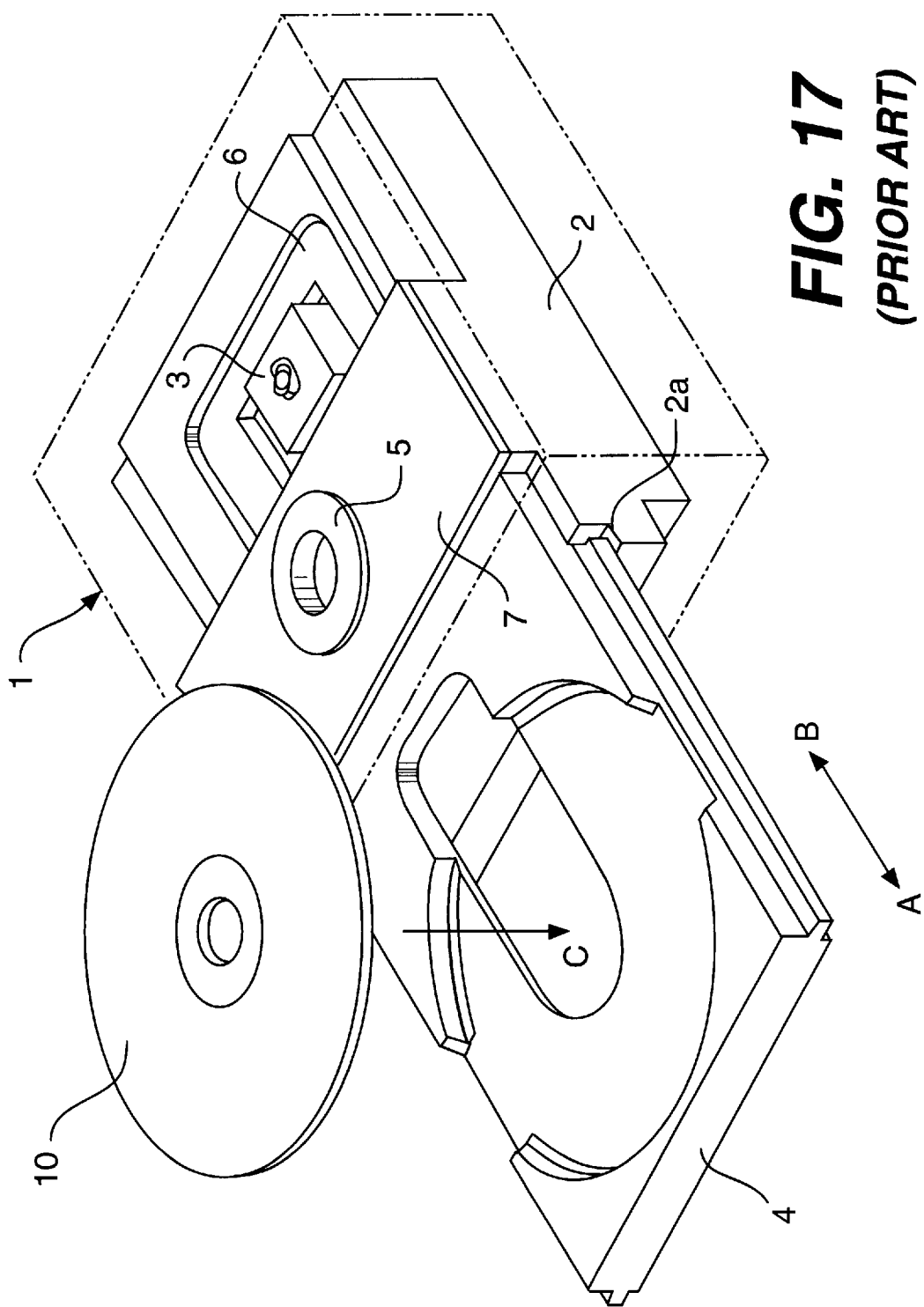
FIG. 17 is a perspective view showing a conventional disc reproducing apparatus.

On the other hand, at this point, the striker 110a is inserted into a lock-on position of the tray lock device 110. After the striker 110a comes to the lock-on position, the striker 110a is returned by the force of a spring (not shown) in the tray lock device 110. Thus, finally, as shown in FIG. 16, the tray 300 is locked at a position slightly returned in the direction Y from the state shown in FIG. 15. At this point, since the motor unit 200 is prohibited from moving in the arrow direction Y by the lock levers 103, 103, a small gap is formed between an edge surface 211 of the motor block 202 and an edge surface 310 of the tray 300. Thus, the tray 300 and the motor unit 200 are not contacted.

Next, with reference to FIG. 14, the state that the tray has been locked will be described in detail. When the tray has been locked, the motor block 202 is held on the mechanical chassis 100 side in such a manner that the guide shafts 101, 101 are inserted into the V groove 202b and the elliptical hole 202. Thus, the motor block 202 is set at a predetermined height. The V groove 202c formed on the motor block 202 has a V-letter shaped section. Thus, when one guide shaft 101 is received along the V groove 202c, the motor block 202 is set at a predetermined horizontal position.

On the other hand, the guide protrusions 104, 104 lower in space portions (holes) formed between the motor block 202 and the magnetic plate 204, thereby pushing down the magnetic plate 204 against the force of the spring 205, 205. Thus, the repulsive force of each of the spring 205, 205 is transmitted to the motor block 202 through the pins 206, 206. Consequently, the repulsive force works as force that causes the motor block 202 to lower. As a result, the motor block 202 is securely supported on the guide shaft 101, 101.

In addition, at this point, the leg portions 202d, 202d of the motor block 202 are placed at positions where the leg portions 202d, 202d float from the cavity portions 300a, 300a of the tray 300. Thus, the tray 300 and the motor block 202 are not contacted. Consequently, vibration is not transmitted to the motor unit 200 through the tray 300.

After the motor unit 200 has been moved to the chassis 100, the pickup 102 moves from a position out of a data area of the disc 600 on the same plane in the arrow direction Y. In FIG. 15, a line denoted by M represents an outermost peripheral position of the data area on the disc 600. When the pickup 102 moves in the arrow direction Y and the shaft holding portion 102a of the pickup 102 comes in contact with the edge surface of the guide shaft support portion 100b, the pickup 102 stops and a reproducing operation starts. When the tray 300 is unloaded, as with the loading operation, the pickup 102 is placed at a position out of the data area of the disc 600 as a stand-by state.

As described above, in the disc reproducing apparatus, when the tray 300 is unloaded and loaded from and to the cabinet 400, the pickup 102 is placed at a position out of the data area of the disc 600 on the same plane. Thus, when the tray 300 is unloaded and loaded from and to the cabinet 400, the possibility in which the pickup 102 contacts the data area of the disc 600 and thereby the data area of the disc 600 is destroyed can be eliminated.

Moreover, in the disc reproducing apparatus, when the motor unit 200 is transferred to the chassis 100, the motor unit 200 is moved in an upper diagonal direction along the tapered surfaces of the guide protrusions 104, 104 and then restored to the flat state. Thus, when the motor unit 200 is restored to the flat state, the disc 600 held on the motor unit 200 may be temporarily inclined due to inertia force. However, when the tray 300 is unloaded and loaded from and to the cabinet 400, since the pickup 102 is placed at a position out of the data area of the disc 600, even if the disc 600 is inclined, the pickup 102 does not contact the data area of the disc 600.

In addition, when the motor unit 200 is held by the chassis 100, the lock lever 103, 103 softly hold the motor unit 200 with elastic force of the springs 107, 107. Thus, even if large vibration is applied to the apparatus and the motor unit 200 is momentarily moved to the tray side due to inertia force, the lock levers 103, 103 are not damaged. At this point, the moving distance of the motor unit 200 on the tray side can be limited to a range in which the motor unit 200 can be returned by the lock levers 103, 103 by the edge surface 310 of the tray 300.

To unload the tray 300 from the cabinet 400, the tray 300 is pushed in the arrow direction X by a finger of the user.

Thus, the tray lock mechanism is released and the tray 300 is slightly moved in forward direction. Since the tray 300 is slightly and automatically pulled out, the user can hold the tray 300 with his (her) hand and pull it in the arrow direction Y. As shown in FIG. 4, the leg portions 202d, 202d of the motor unit 200 are placed in the cavity portions 300a, 300a of the tray 300 in float state or contact state. Thus, when the tray 300 is pulled out in the arrow direction Y, the motor unit 200 is moved from the holding position on the chassis 100 side to the holding position (cavity portions 300a, 300a) of the tray 300.

The positions of both the edge surfaces of the guide shaft support portion 100b that supports edge portions of the guide shafts 101, 101 are important to precisely align the pickup 102 and the motor unit 200. When the disc is for example a CD (compact disc), it is important to read TOC (Table Of Content) information that is recorded on the inner peripheral side of the disc 600. The TOC information is record information (index information) of data recorded on the disc 600.

In the disc reproducing apparatus, when the pickup 102 moves to the last end in the arrow direction Y and the shaft holding portion 102a of the pickup 102 contacts the edge surface of the guide shaft support portion 100b, the width in the directions X–Y of the guide shaft support portion 100b is optimally selected so that the read position by laser beam accords with the TOC area formed on the innermost peripheral track side of the disc 600.

The shutter 302 disposed on the tray 300 has two functions, one of which prevents foreign matter from entering the tray 300, the other of which prevents the motor unit 200 from dropping from the tray 300. Thus, the disc reproducing apparatus can be used as an upright type apparatus.

Industrial Utilization

As described above, according to the present invention, a small and thin disc reproducing apparatus can be easily accomplished. In addition, according to the present invention, a disc reproducing apparatus that can stably perform a reproducing operation against external shock can be accomplished.

In other words, when the tray has been unloaded from the cabinet, the motor unit is held by the tray. Thus, it is not necessary to provide a disc clamp mechanism in the cabinet. In addition, when the tray is loaded into the cabinet, since the motor unit is transferred from the tray to the mecha-unit in the cabinet and held therein, external vibration is not transmitted to the motor unit through the tray. Thus, when the mecha-unit is supported on the cabinet through the damper, all the transmission paths of external vibration applied to the motor unit can be completely shut out.

In addition, according to the disc reproducing apparatus of the present invention, when the tray has been unloaded from the cabinet, since the lines that electrically connect the tray and the cabinet are disconnected, the connection lines can be prevented from working as a radiation noise source. Thus, according to the present invention, a disc reproducing apparatus that does not apply noise problem to an external device (for example, host computer) can be accomplished.

We claim:

1. A disc reading apparatus, comprising:
   a cabinet;
   a tray for holding a disc having data recorded thereon, said tray being supported by said cabinet so that said tray can be unloaded from and loaded into said cabinet;
   a motor unit including a turntable and a motor, the turntable securing the disc held on said tray and the motor driving the turntable when operating;
   a pickup for reading the data recorded on the disc;
   a chassis including a mechanism for supporting said pickup such that said pickup is movable in a radial direction of the disc held on said tray;
   a first holding portion, disposed on said tray, for holding said motor unit at least when said tray is unloaded from said cabinet;
   a second holding portion, disposed on said chassis, for holding said motor unit at a position where said pickup reads the data from the disc at least when said tray is loaded in said cabinet; and
   transfer means for transferring said motor unit held by said first holding portion to said second holding portion when said tray is loaded into said cabinet and for transferring said motor unit held by said second holding portion to said first holding portion when said tray is unloaded from said cabinet.

2. The disc reading apparatus as set forth in claim 1, wherein said tray and said chassis do not contact one another when data is read from the disc.

3. The disc reading apparatus as set forth in claim 1, wherein said chassis is supported by said cabinet through a damper.

4. The disc reading apparatus as set forth in claim 1, wherein said motor unit is held by said second holding portion such that said motor unit and said tray do not contact one another when data is read from the disc.

5. The disc reading apparatus as set forth in claim 1, wherein the position at which said motor unit is held by said first holding portion is different from the position at which said motor unit is held by said second holding portion in the direction of thickness of the disc held on the turntable.

6. The disc reading apparatus as set forth in claim 5, wherein the relationship L1>L2 is satisfied, L1 being the distance between said motor unit held by said first holding portion and said pickup in the direction of the thickness of the disc, and L2 being the distance between said motor unit held by said second holding portion and said pickup in the direction of the thickness of the disc.

7. The disc reading apparatus as set forth in claim 1, wherein said transfer means includes:
   a lever rotatably mounted on said chassis;
   elastic force applying means for elastically applying rotating force to said lever; and
   a first cam disposed on said lever, said first cam contacting said motor unit held by said first holding portion when said tray is inserted in the cabinet from a first position to a second position so that the lever rotates in a direction opposite to the rotating force applied by said elastic force applying means.

8. The disc reading apparatus as set forth in claim 7, further comprising a second cam disposed on the lever, the second cam contacting said motor unit when said tray is inserted in the cabinet to a third position further in the cabinet than the second position so that said motor unit is pulled to said second holding portion by the force of said elastic force applying means.

9. The disc reading apparatus as set forth in claim 1, 7, or 8, wherein said transfer means includes:
   a guide hole formed in said motor unit along unloading and loading directions of said tray; and
   a guide protrusion, secured to said chassis, for insertion into the guide hole of said motor unit held by said first holding portion of said tray so that said motor unit is guided to said second holding portion when said tray is inserted into said cabinet.

10. The disc reading apparatus as set forth in claim 9, wherein said guide protrusion includes a first taper for contacting an inner surface of the guide hole of said motor unit so that said motor unit is separated from said first holding portion and guided to said second holding portion of said chassis when said tray is inserted into said cabinet.

11. The disc reading apparatus as set forth in claim 10, wherein the guide protrusion includes a second taper for correcting relative displacement between the guide protrusion and the guide hole, the second taper being formed at an edge portion of said guide protrusion.

12. The disc reading apparatus as set forth in claim 1, wherein the chassis includes a guide shaft for moving said pickup along the radial direction of the disc held on said tray, and wherein the disc reading apparatus further comprises a shaft support portion for supporting an edge portion of the guide shaft, the shaft support portion having a first surface and a second surface, the first surface forming said second holding portion and the pickup being movable to a position in which the pickup is in contact with the second surface.

13. The disc reading apparatus as set forth in claim 12, wherein said pickup reads information from a table of contents area formed at the innermost periphery on the disc when said pickup is in contact with the second surface of said shaft support portion, the table of contents area including recorded index information for data recorded on the disc.

14. The disc reading apparatus as set forth in claim 1, wherein said pickup is placed at a horizontal position outside of a data record area on the disc instead of a position where said motor unit is held by said second holding portion when said tray is unloaded from and loaded into said cabinet.

15. The disc reading apparatus as set forth in claim 1, further comprising:

a first lock member secured to said tray;

a second lock member disposed on said cabinet, said second lock member being connected to said first lock member so as to secure said tray to said cabinet when said tray is inserted in a predetermined position in said cabinet; and elastic support means for elastically supporting the second lock member on said cabinet so as to generate repulsive force in the direction said tray is inserted into said cabinet.

16. The disc reading apparatus as set forth in claim 15, wherein said elastic support means includes:

a first support member for supporting said cabinet so as to move the second lock member in unloading and loading directions of said tray; and a second support member for elastically supporting said second lock member at a predetermined position in said cabinet in the loading direction of said tray.

17. The disc reading apparatus as set forth in claim 1, further comprising:

a shaft hole formed in said motor unit in the same direction as unloading and loading directions of said tray;

a guide shaft adapted for movably supporting said pickup along the radial direction of said disc, said guide shaft being held on said tray and having an edge portion insertable into the shaft hole so as to hold said motor unit when said motor unit is transferred from said first holding portion to said second holding portion by said transfer means.

18. The disc reading apparatus as set forth in claim 1, further comprising:

a shutter movable on said tray in unloading and loading directions of said tray, the shutter covering an upper surface of said motor unit held by said first holding portion without covering a portion of said turntable at least when said tray is unloaded from said cabinet.

19. The disc reading apparatus as set forth in claim 18, wherein the shutter exposes the upper surface of said motor unit when said motor unit is held by said second holding portion.

20. The disc reading apparatus as set forth in claim 18 or 19, further comprising:

opening prevention means for preventing said shutter from being opened when said tray is unloaded from said cabinet.

21. The disc reading apparatus as set forth in claim 20, wherein said opening prevention means includes:

a lock hole formed in said shutter; and a lock member having a first edge portion, a second edge portion, and a middle portion, the first edge portion being supported by said tray, the second edge portion having a protrusion insertable into the lock hole when said tray is unloaded from said cabinet, and the middle portion being curved.

22. The disc reading apparatus as set forth in claim 1, wherein said first holding portion is a cavity portion or a protrusion portion engaged with said motor unit, and wherein said motor unit includes an engagement portion engaged with the cavity portion or the protrusion portion.

23. The disc reading apparatus as set forth in claim 22, wherein the cavity portion or the protrusion portion and the engagement portion of said motor unit have respective tapered surfaces formed on respective contacting surfaces so as to correct displacement along planes thereof.

24. The disc reading apparatus as set forth in claim 1, further comprising:

a magnetic substance or a first magnet secured to said motor unit; and a second magnet secured to said tray, said second magnet attracting said motor unit to said tray via the magnetic substance or the first magnet.

25. The disc reading apparatus as set forth in claim 1, further comprising:

a first magnet secured to said motor unit; and a magnetic substance or a second magnet secured to said tray, said magnetic substance or said second magnet attracting said motor unit to said tray via the first magnet.

26. The disc reading apparatus as set forth in claim 1, further comprising:

a supply circuit disposed in said cabinet, the supply circuit supplying electric power for driving the motor of said motor unit;

a power circuit for electrically connecting the supply circuit to the motor; and switch means for opening and closing said power circuit so as to supply the electric from said power supply circuit to the motor only when said tray is loaded into said cabinet.

27. The disc reading apparatus as set forth in claim 1, further comprising:

a supply circuit disposed in said cabinet, the supply circuit supplying electric power for driving the motor of said motor unit;

a power circuit for electrically connecting said supply circuit to the motor;

switch means for opening and closing the power circuit so as to supply the electric power from said supply circuit to the motor only when said tray is loaded in said cabinet; and short-circuit means for short-circuiting a portion of said power circuit connected to the motor when said switch means opens said power circuit.

28. The disc reading apparatus as set forth in claim 27, wherein the switch means includes a pair of electrode plates on the tray and a pair of contacts on the cabinet, the pair of electrode plates contacting the pair of contacts when the tray is in the loaded position in the cabinet.

29. The disc reading apparatus as set forth in claim 28, wherein the short-circuit means includes opposed surfaces of the pair of electrode plates biased to contact with one another, and wherein the cabinet includes a non-conductive protrusion for separating the opposed surfaces of the electrode plates when the tray is in the loaded position.

30. The disc reading apparatus as set forth in claim 1, wherein said cabinet includes a circuit board having at least a clock generator for generating a clock pulse for reading digital data.

31. A disc reading apparatus, comprising:

a cabinet;

a tray for holding a disc having data recorded thereon, the tray being loadable into and unloadable from said cabinet;

a motor, disposed on said tray, for driving the disc held on said tray; means for reading data from the disc;

a supply circuit, disposed in said cabinet, for supplying electric power for driving said motor;

a power circuit for electrically connecting said supply circuit to said motor;

switch means for opening the power circuit when the tray is out of a loaded position in the cabinet so as to prevent flow of the electric power from the supply circuit to the motor and for closing the power circuit only when said tray is in said loaded position in said cabinet so as to allow flow of electric power from the supply circuit to the motor the switch means including a pair of electrode plates on the tray and a pair of contacts on the cabinet, the pair of electrode plates contacting the pair of contacts when the tray is in the loaded position in the cabinet; and short-circuit means for short-circuiting a portion of the power circuit connected to said motor when said switch means opens the power circuit; the short-circuit means including opposed surfaces of the pair of electrode plates biased to contact with one another, the cabinet including a non-conductive protrusion for separating the opposed surfaces of the electrode plates when the tray is in the loaded position.

* * * * *